(12) United States Patent
Pellegrin et al.

(10) Patent No.: US 10,646,819 B2
(45) Date of Patent: *May 12, 2020

(54) ABSORBER

(71) Applicant: Industrial Climate Solutions Inc., Calgary (CA)

(72) Inventors: Roy Pellegrin, Idaho Falls, ID (US);
William Hargrove, Easton, MD (US);
Leonard Pecos, Hillsboro, OR (US);
Craig Dugan, Mulgrave (AU); Bobby Liu Zhenshuo, Missouri City, TX (US)

(73) Assignee: Industrial Climate Solutions, Inc., Calgary (CA)

( * ) Notice: Subject to any disclaimer, the term of this patent is extended or adjusted under 35 U.S.C. 154(b) by 22 days.

This patent is subject to a terminal disclaimer.

(21) Appl. No.: 15/530,439

(22) Filed: Jan. 12, 2017

(65) Prior Publication Data

US 2017/0136406 A1    May 18, 2017

Related U.S. Application Data

(63) Continuation-in-part of application No. 13/998,875, filed on Dec. 16, 2013, now Pat. No. 9,545,598, which is a continuation-in-part of application No. 13/385,305, filed on Feb. 13, 2012, now abandoned.

(51) Int. Cl.
*B01D 53/18* (2006.01)
*B01D 53/14* (2006.01)

(52) U.S. Cl.
CPC .......... *B01D 53/18* (2013.01); *B01D 53/1475* (2013.01); *B01D 2252/20405* (2013.01); *B01D 2252/20421* (2013.01); *B01D 2252/20484* (2013.01); *B01D 2258/0283* (2013.01); *Y02C 10/06* (2013.01)

(58) Field of Classification Search
None
See application file for complete search history.

(56) References Cited

U.S. PATENT DOCUMENTS

| 4,231,767 A | * | 11/1980 | Acker | B01D 19/0031 166/105.5 |
| 2007/0137482 A1 | * | 6/2007 | Xu | B01D 1/305 95/198 |
| 2008/0017032 A1 | * | 1/2008 | Pellegrin | B01D 47/04 95/150 |

* cited by examiner

*Primary Examiner* — Anita Nassiri-Motlagh
(74) *Attorney, Agent, or Firm* — Bruce H Johnsonbaugh

(57) ABSTRACT

An absorber is provided which uses a liquid solvent formed into a myriad of bubbles and micro-droplets. The solvent froth is a solvent for a selected component in an incoming gas stream. A plurality of spaced apart screen assemblies is placed in a reaction vessel. Using screens having cross-sections that are substantially rectangular wave in design together with proper operating parameters, the phenomenon of solvent plug pulsing is induced and maintained, maximizing efficiency of the absorber.

9 Claims, 29 Drawing Sheets

ABSORBER

CROSS REFERENCE TO RELATED APPLICATION

This application is a Continuation-in-Part of U.S. application Ser. No. 13/998,875 filed Dec. 16, 2013, which application was a Continuation-in-Part of U.S. application Ser. No. 13/385,305 filed Feb. 13, 2012.

BACKGROUND

Typical prior art absorbers utilize what is described herein as a static, fixed surface area on which the absorption occurs. For example, a common absorber design is a "shaped packing" design. In this design, packing elements with complex surface shapes are placed in a fixed size chamber. A liquid solvent is typically caused to flow downwardly and wet the fixed size exterior surfaces of the elements. This provides a large surface area for mass transfer between the solvent and the gas. A gas is then driven upwardly through the packing, and a selected component of the gas is absorbed into the surface of the solvent. The surface area of the packing remains fixed and static. The three commercial types of packing are random, structured trays, and spray towers. The fixed and static surface area is a major limitation of the prior art.

Another common limitation of known absorbers is the relatively short amount of time in which the two fluids are in surface contact with each other. The prior art designs typically use a counter-flow arrangement wherein the solvent in the above specific shaped packing example flows downwardly and the gas flows upwardly. The counter-flow technique is utilized to maximize the concentration gradient between the two fluids but has the inherent limitation of minimizing the time in which the surfaces of the two fluids are in contact.

A further limitation of these conventional packings is the significant height of packing required to facilitate the absorption process. A further limitation of most prior art absorbers is that they require relatively expensive materials in their construction. The large surface area of these packings which is required to facilitate absorption also makes them susceptible to fouling where the surfaces can become fouled with dirt, impurities from the gas or liquid or precipitation products from the absorption itself.

The present invention overcomes all of the above limitations of the prior art.

BRIEF SUMMARY OF INVENTION

The present invention not only overcomes the above limitations of the prior art; the applicants have identified and utilized in the most preferred embodiment the hydrodynamic phenomenon described below as "solvent pulsing." This phenomenon significantly enhances absorption efficiency in the absorber described herein. We have been able to successfully induce "solvent pulsing" by using the system described below. We believe that the absorber described below is the first froth based absorber to induce and maintain "solvent pulsing" to maximize efficiency. In the preferred embodiment, a novel array of screens is positioned near the top of a vertical reaction vessel and is used to induce solvent pulses which extend uniformly across the entire cross section of the reaction vessel. We refer herein to such pulses as "solvent plug pulses," or sometimes as "plugs." The array of screens is referred to as an "induction array." These plugs maximize turbulence and prevent channeling, increasing mass transfer by more than 25% compared with the same absorber which does not utilize solvent pulsing. Solvent plug pulsing is the most efficient form of solvent pulsing in our view.

The present invention, in contrast to using the prior art static, fixed surface area, creates dynamic, rapidly changing, large surface area for a given volume. Solvent bubbles and droplets are intentionally caused to burst and are formed and shattered, at a rapid rate. The objective is to create the densest possible array of the smallest bubbles, droplets and micro-droplets and to repeatedly, rapidly and violently cause each of them to break up or fragment. The mass transfer surface is greatly increased and constantly refreshed, thereby maximizing the mass transfer (or absorption) within a given volume of an absorber reaction chamber. The contact environments range from an aqueous-froth column with a micro-froth matrix that is reformed at high frequency, to a transient froth that alternates at high frequency from a micro-froth matrix to a projectile spray fueled by bursting bubbles, to a shear-spray with isolated membrane rupture and impact fragmentation. Each of these dynamic mass transfer processes provide a high reactant surface area and a dramatic increase in absorption efficiency compared to conventional gas/liquid absorbers.

The present invention uses specially shaped and spaced apart screens to fragment the solvent froth into a myriad of droplets which creates a very large surface area for mass transfer, which surface is made up of the solvent itself. But instead of leaving the small droplets intact in a confined space which would produce a relatively static, fixed surface area similar to prior art devices, the present invention continuously and violently fragments and reforms the droplets at a rapid rate. Bubbles also form which in turn are caused to burst, forming thousands of microscopic droplets from each bursting bubble, whereby the active surface area of the liquid solvent is further increased. This high frequency and continuous regeneration of the surface of the liquid solvent is a significant aspect of the invention. An enormous reaction surface is created in a small volume. The reaction surface is continuously and violently ruptured and reformed to maximize the efficiency of the mass transfer.

The present invention also differs significantly from the prior art in that it maximizes the time period of contact between gas and solvent by using a concurrent (or co-current) flow as opposed to a counter flow technique. By maximizing the time period of contact, we inherently maximize the efficiency of the absorption process. The time period of contact may be further extended by using multiple stages in the process.

The present invention, by continuously and rapidly regenerating the surface area of the solvent maintains a maximized concentration gradient across the entire surface of the solvent for the entire time period in which the gas and solvent are in contact with each other, all for the purposes of mass transfer. Any given droplet or bubble will interact with the gas across its entire surface momentarily, and then as the bubbles burst as they pass through the next screen, many droplets are fragmented into micro-droplets, some droplets coalesce and are then reformed as the liquid is forced through the screen. Each time this process is repeated the freshly formed surface provides a new lean solvent surface area to interact with the gas with a maximized concentration gradient, since the surfaces of the bubbles, droplets, and micro-droplets do not remain intact long enough to become saturated with the component being removed or absorbed from the gas.

In addition to the above advantages, the applicants have identified and utilized, for the first time in a froth-based absorber, the hydrodynamic phenomenon referred to herein as "solvent pulsing," which substantially increases absorption efficiency. Although overall liquid-gas molar flow rate ratios are comparable to conventional contactors, solvent volumetric flow rate in the present absorber is not constant. Rather, solvent volumetric flow rate initially is low and a fraction of the solvent accumulates in the pulsing screens described herein. Upon reaching a critical saturation, a large fraction of the accumulated solvent travels downstream at high volumetric flow rate in a pulse. After the pulse, the solvent volumetric flow rate is low again until another pulse occurs. This repeats ad infinitum. This pulsing is beneficial because at flow rates and liquid-gas ratios similar to that of conventional columns the Reynolds number for the liquid places it squarely in the laminar regime. However, because the absorber experiences the pulsing phenomenon, it greatly increases the volumetric flow rate during a pulse bringing it more in line with turbulent flow. There exists numerous literature that show turbulent flow causes better mixing. Furthermore, high speed photography shows pulsing enhancing the formation of micro-froth. Literature also exists that show froth and bubble structures enhance contact area. The use of co-current flow and the geometry of the screens allow for these important solvent pulses to occur.

In the embodiments where precipitating solvents are utilized, the present invention also prevents clogging of the reaction vessel by precipitants. This "anti-clogging" feature is achieved by constantly reforming the solvent froth to minimize the size of solvent bubbles in the froth, thereby minimizing the size of precipitants and preventing clogging of the reaction vessel.

The present invention also differs significantly from the prior art in that less materials can be used to fabricate the absorber of the present invention.

The present invention also represents a significant improvement over existing absorber systems. An inherent limitation of such absorbers is the efficiency and physical size of the absorber. As the liquid stream trickles down through the packing any non-uniformity in the packing or maldistribution of the liquid onto the packing or the absorber itself not being perfectly level will cause channeling of the liquid. This channeling or maldistribution will reduce the effective surface area of the packing available for mass transfer thereby reducing the efficiency of the absorber. To prevent this, packing bed heights are limited to 5 to 10 m and require redistributors for the gas and liquid between packed sections.

The present invention includes a technique which eliminates "channeling" and also simultaneously increases the efficiency of absorbers and allows for the absorbers to be any shape. The present invention in some embodiments utilizes an array of tubes strategically placed in the reaction chamber; the tubes force the gas stream to divide itself into smaller, equally sized sub streams to flow through the array of tubes. This technique causes all portions of the gas and liquid streams to be equally distributed thus eliminating the problems of channeling or maldistribution associated with conventional absorbers and allowing for absorbers of significantly larger diameter than absorbers using conventional packing. These tubes can be round, square, polyhedral or almost any geometric shape.

In yet another embodiment the tubes may be replaced altogether with continuous packs of corrugated and/or flat screens which fill the full diameter of the absorber vessel. These "packs" would be held in place by supporting rings and grids and solvent would be dispersed evenly onto the top of the packs using any one of a number of conventional liquid distributors.

The use of the above techniques together in combination in the most preferred embodiment provides, for the first time known to applicants a universal absorber that can be utilized with virtually any gas and liquid. The combined use of:
 a continuously regenerated reaction surface area created by rapidly and continuously forming solvent droplets and bubbles, bursting bubbles and fragmenting or shattering droplets to form further micro-droplets;
 maintaining a maximized concentration gradient over the entire reaction surface during the entire reaction time period; maximizing the time period of the reaction by use of concurrent flow; and
 utilizing "solvent plug pulsing" to enhance efficiency;
results in forming a new universal absorber that overcomes the above noted limitations of prior art absorbers.

A primary object of the invention is to provide an absorber utilizing the features described in the preceding paragraph to improve absorption efficiency.

In an alternate embodiment an array of properly placed tubes is used in the reaction chamber to prevent channeling of plumes, increase overall efficiency and to allow the use of large, efficient froth reaction chambers (more than 15 meters in diameter for a cylindrical chamber).

A further object of the invention is to provide an absorber capable of use with large reaction chambers, but which eliminates channeling. Other objects will become apparent from the following description and drawings.

DETAILED DESCRIPTION OF THE DRAWINGS

Description

We define important phrases used herein and in the claims as follows:

As used herein and in the claims, the phrase "solvent plug pulsing" means the periodic, abrupt and violent separation of clumps of accumulated solvent based froth and microdroplets from a tier of shaped screens uniformly across the entire surface of each screen, occurring at frequencies of between 1 and 20 cycles per second. The solvent plug pulses move through the reaction chamber in a "periodic wave" fashion, as opposed to a trickle flow or laminar flow. When "solvent plug pulsing" has been induced and maintained, turbulence within the reaction chamber has been maximized.

The phrase "substantially rectangular wave cross-section" as used in this specification and in the claims shall mean a cross-section having a plurality of waves as illustrated in FIG. 12-15; wherein each wave is rectangular, has a flat top surface and a flat bottom surface, each of which lies in a plane within 5° of being perpendicular to the gas stream flow direction; and wherein each top surface has two sidewalls extending downwardly, and each side wall is flat and lies in a plane within 5° of the gas stream flow direction.

Figure 1:
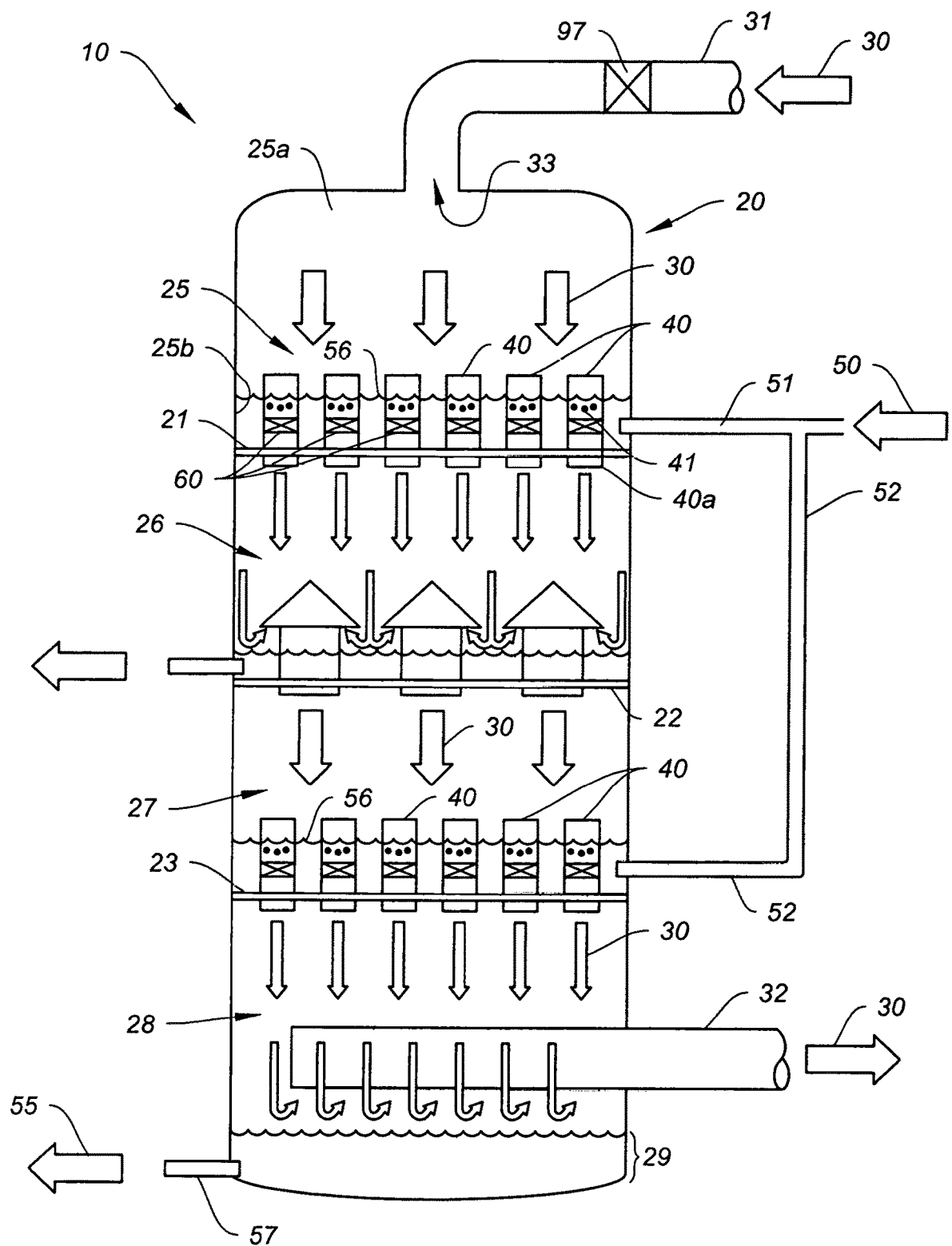
FIG. 1 is a schematic illustration of an absorber referred to herein as a "flooded tube gas absorber" (FTGA), shown in a sectional view.

FIG. 1 shows the first embodiment of the invention, referred to herein as a "flooded tube gas absorber" (FTGA). The bubbly, solvent froth formed in absorption tubes 40 is not shown for clarity. It includes a reaction or absorber vessel 20 which as shown is a cylindrical, vertically extending vessel, which may, in some uses, exceed 15 meters in diameter. Reaction or absorber vessel 20 may be virtually any shape, and have cross-sections which are circular, oval, rectangular, polyhedral, or other shape.

An incoming, flow gas stream 30 such as flue gas from a fossil fuel power plant, flows into inlet duct 31 connected to inlet port 33 at the top or upper end of vessel 20. Gas stream 30 contains a selected component, such as $CO_2$, for example, in the case of a flue gas stream, to be absorbed. Incoming flowing gas stream 30 flows downwardly vertically through reaction or absorption vessel 20, and after being subjected to the absorption process described herein, is discharged through outlet duct 32.

Reaction vessel 20 has a first chamber 25 and a second chamber 26 separated by bulkhead plate 21 extending horizontally across vertical reaction vessel 20. First chamber 25 is fluidly connected to gas inlet duct 31 to allow flow of pressurized gas stream 30 into first chamber 25. Bulkhead plate 21 extends across outlet end 25*b* of first chamber 25 to separate first chamber 25 from adjacent second chamber 26.

A plurality or array of discrete, vertically oriented absorption tubes 40 is carried in respective flow ports 40*a* formed through bulkhead plate 21. Each of the absorption tubes 40 extends through bulkhead plate 21 into first chamber 25 to define a respective conduit for the flow of gas stream 30 from first chamber 25 into second chamber 26. These tubes being of any one of a number of possible geometric shapes. The flow ports 40*a* and absorption tubes 40 are sized and positioned to equalize the flow speed of gas stream 30 downwardly through each absorption tube 40 from first chamber 25 into second chamber 26.

Fan 97 constitutes means for pressurizing gas stream 30 in first chamber 25 to cause a back pressure in chamber 25, which in turn causes gas stream 30 to flow at substantially the same, equal flow rates through each of the absorption tubes 40 into second chamber 26, thereby eliminating the prior art problem of "channeling" (see FIG. 21 and description below).

As shown in FIG. 1, an optional second bulkhead plate 23 (identical to plate 21) is placed below first bulkhead plate 21 to form an additional set of chambers 27 and 28 which are identical to the chambers 25, 26.

An array of discrete, vertically oriented absorber tubes 40 are densely mounted to and carried in flow ports 40*a* in the bulkhead plates 21 and 23. The gas absorber tubes 40 are mounted perpendicular to the plates 21, 23 and parallel with the vertical axis of the vessel 20. The number of gas absorber tubes required on each stage is dependent on the gas and liquid flow. Each stage may include one tube or many thousands of tubes. Each of the absorption tubes 40 extends through bulkhead plate 21 to define a respective conduit for the flow of gas stream 30 from first chamber 25 into second chamber 26. The tubes 40 and ports 40*a* carrying tubes 40 are sized and positioned to equalize the flow speed of gas stream 30 downwardly through each tube from first chamber 25 to second chamber 26.

Lean liquid solvent is fed into the absorber above plate 21 by inlet lines 51 to flood the space above bulkhead plate 21 and between the tubes 40 forming a solvent reservoir 56. Liquid solvent 50 may be any solvent capable of absorbing the selected component, $CO_2$, in the example given. Each tube 40 carries a screen assembly 60 described below. Solvent then is injected through holes and/or the slots 41 into each of the tubes 40 onto a screen assembly (or froth generator) 60 to mix with the gas stream 30 and establish froth droplets and bubbles (both not shown for clarity) inside tubes 40. Alternatively solvent may simply flow over the top of the absorber tubes negating the need for holes or slots. In these cases the top of the tubes may have notches (FIG. 4C) to allow the solvent to drain at set points into the tube or the tube lip may be even creating an even solvent flow over the entire top of the tube. Each of these techniques injects liquid solvent into each of the absorption tubes 40 and through a plurality of mesh screens 60 provided in each tube 40 to form an aqueous bubbly froth from said liquid solvent inside each of the absorption tubes 40 as gas stream 30 flows through the tube 40. Each mesh screen extends transversely between side walls of each tube 40.

Each tube is fitted with an array of screens as described below. These screens act to burst, shatter, fragment or break up the bubbles in the aqueous froth into a myriad of droplets and micro-droplets of different radii which creates a very large, rapidly changing solvent surface, as described in detail in U.S. Pat. No. 7,854,791, incorporated herein by reference. The solvent bubbly froth and micro-droplets are not shown in the drawings herein for clarity. The screen assemblies shown in FIGS. 2, 3, 6, 10A, 10B and 12-15 may be utilized in tubes 40. Each of those assemblies has a plurality of vertically spaced apart mesh screens. Each screen may have any of the preferred cross-sections shown in FIGS. 12-15, as well as any shaped screen or corrugated screen as described below.

The injection of solvent into each of the absorption tubes may be done by various techniques described herein, all of which will form an aqueous froth in each absorption tube, in a manner that the screen assemblies cause bubbles in the froth to burst, reform, and burst repeatedly to form numerous micro-droplets of different radii, thereby creating a rapidly changing surface area for absorption.

In some cases in order to deliver the leanest solvent to each stage the lean solvent may be fed directly to each stage (line 52). In this case there would be a separate lean solvent feed line to each stage and a separate dehydration stage below each absorber stage.

Where separation of the gas and liquid is required, multiple liquid/gas separators are mounted directly below the tubes. One possible form of these separators is shown, but others exist. The passageways through the liquid/gas separators establish fluid (gas) communication between the initial dewatering chamber 26 and a next absorber stage 27 of the absorber vessel. In this step the liquid falls and settles into the space between the separators and can then be drawn off as a continuous liquid stream through a rich solvent drain line 53 to be regenerated into lean solvent. The gas 30 in turn passes through the separator tubes and into the next absorber stage. The need to remove the liquid absorbent after each absorber stage is dependent on the requirements of each application.

In other cases all the lean solvent will enter the absorber via a single line at the top of the absorber and will pass through the multiple stages of the absorber to be removed at the bottom or absorber sump.

The gas and liquid leaving the tubes flows into the next stage in the absorber.

In applications where liquid absorbent removal is not required, the partially spent absorbent from the first stage will fall into the liquid-absorbent reservoir of the next stage, and in-turn enter the gas absorber tubes.

The final dehydration stage 28 includes a rich-solvent reservoir 29 in the bottom of the vessel 20. A horizontal gas outlet duct 32 projects through the vessel wall in the final dewatering chamber to allow the gas 30 to leave the absorber vessel 20.

Fresh or lean solvent 50 is delivered to the absorber through inlet line 51 and in the case of multiple inlets 52 and others.

Rich solvent 55 (the solvent already used to absorb components from the gas) exits through drain 57 at the bottom of vessel 20 and is directed to a solvent regeneration system which is not the subject of this patent application.

The solvent regeneration system uses heat and/or a vacuum to strip the component which has been removed from the gas stream from the solvent so that the regenerated solvent can in turn be reused in the absorber.

Figure 2:
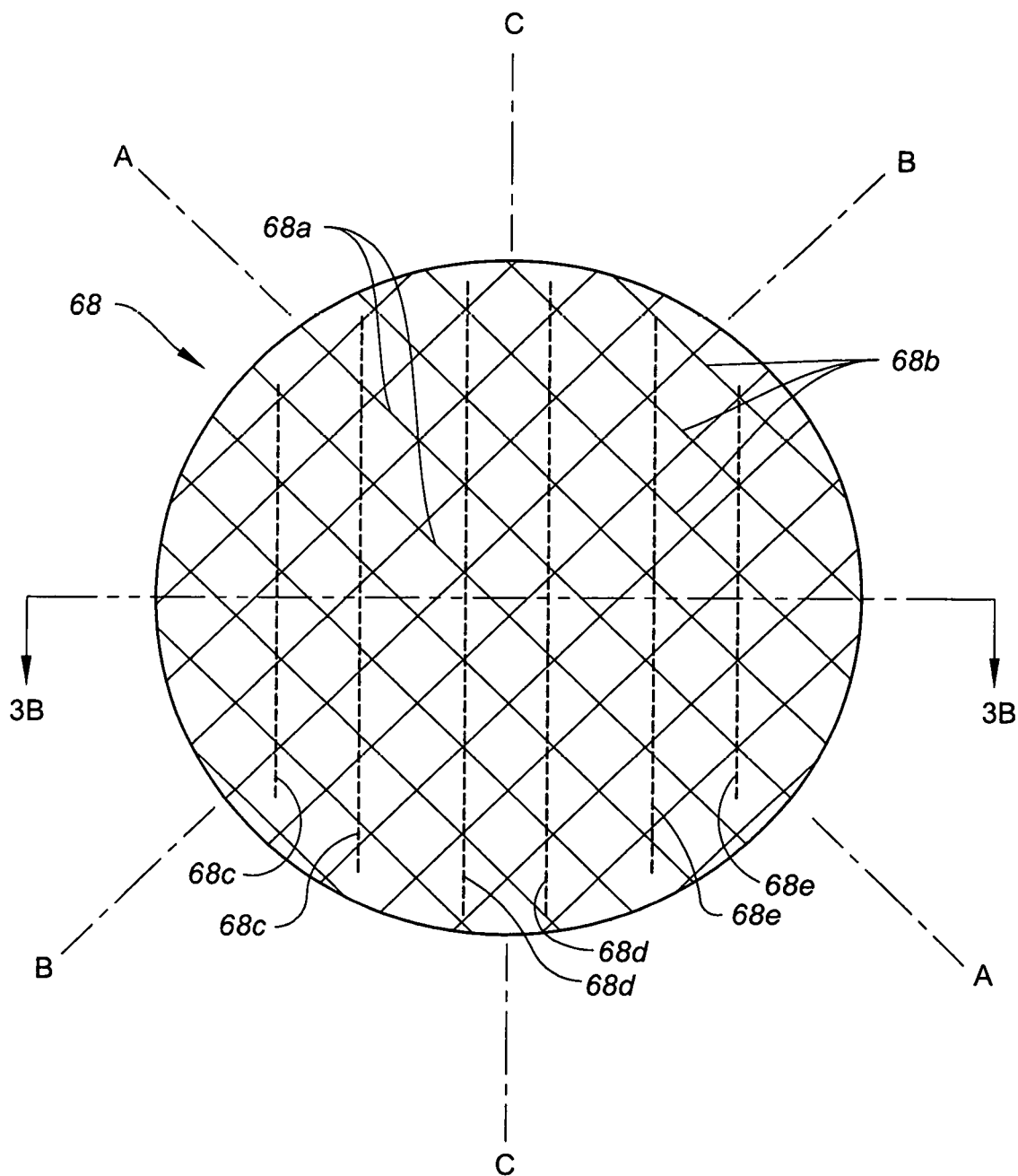
FIG. 2 shows a single shaped screen with a square wave cross-section.
Figure 3:
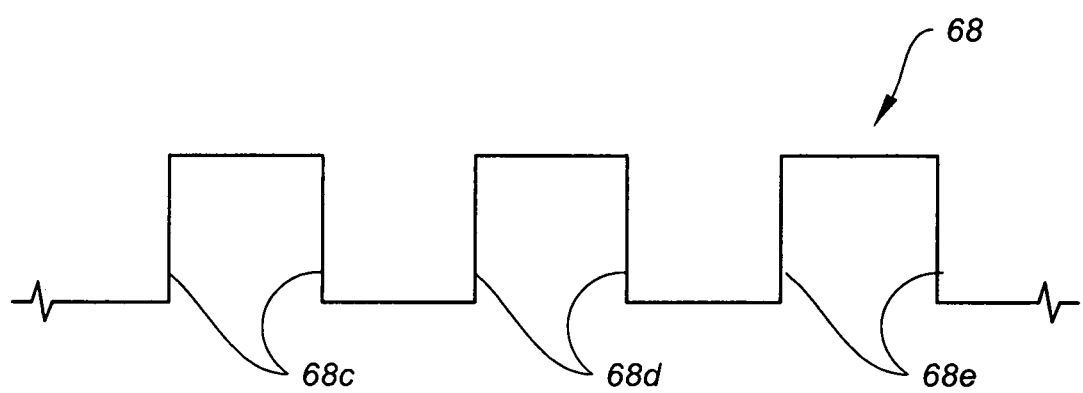
FIG. 3 is a section on the line 3-3 of FIG. 2.

FIGS. 2 and 3 illustrate a circular screen 68. The mesh filaments 68a and 68b are woven perpendicularly to each other and have linear axes A-A and B-B. Substantially rectangular or square waves (see FIG. 3B) 68c, 68d and 68e are formed in screen 68, having axes C-C. The C-C axes 68c-68e preferably form a 45° angle with the linear axes A-A and B-B of screen filaments 68a and 68b, respectively.

FIG. 4A-4E illustrates various absorber tube designs. Each of these absorber tubes can be utilized with various screen assembly designs inside the absorber tube. Each of these tube designs, working together with solvent reservoir 56 (FIG. 1) comprise means for injecting liquid solvent 50 downwardly into each absorption tube 40.

Figure 4A:
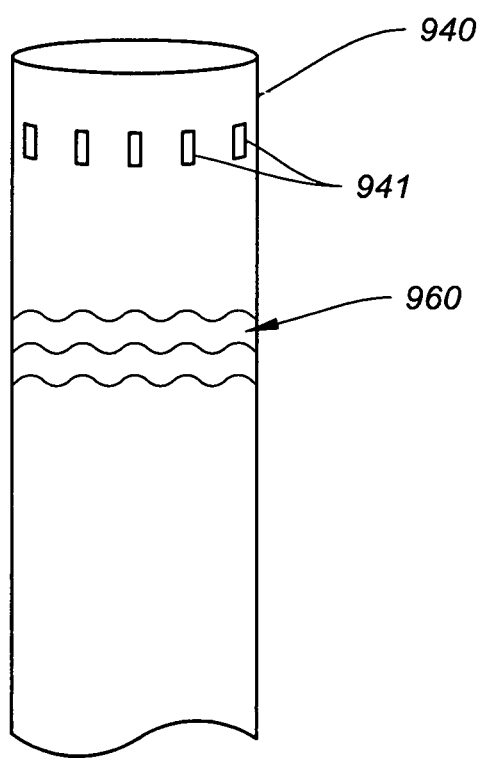
FIG. 4A shows an absorber tube with a row of rectangularly shaped holes.

FIG. 4A illustrates a tube 940 having a row of rectangular slots 941 formed in its side wall; solvent flow through slots into tube 940. Screen assembly 960 is mounted inside tube 940 below row 941.

Figure 4B:
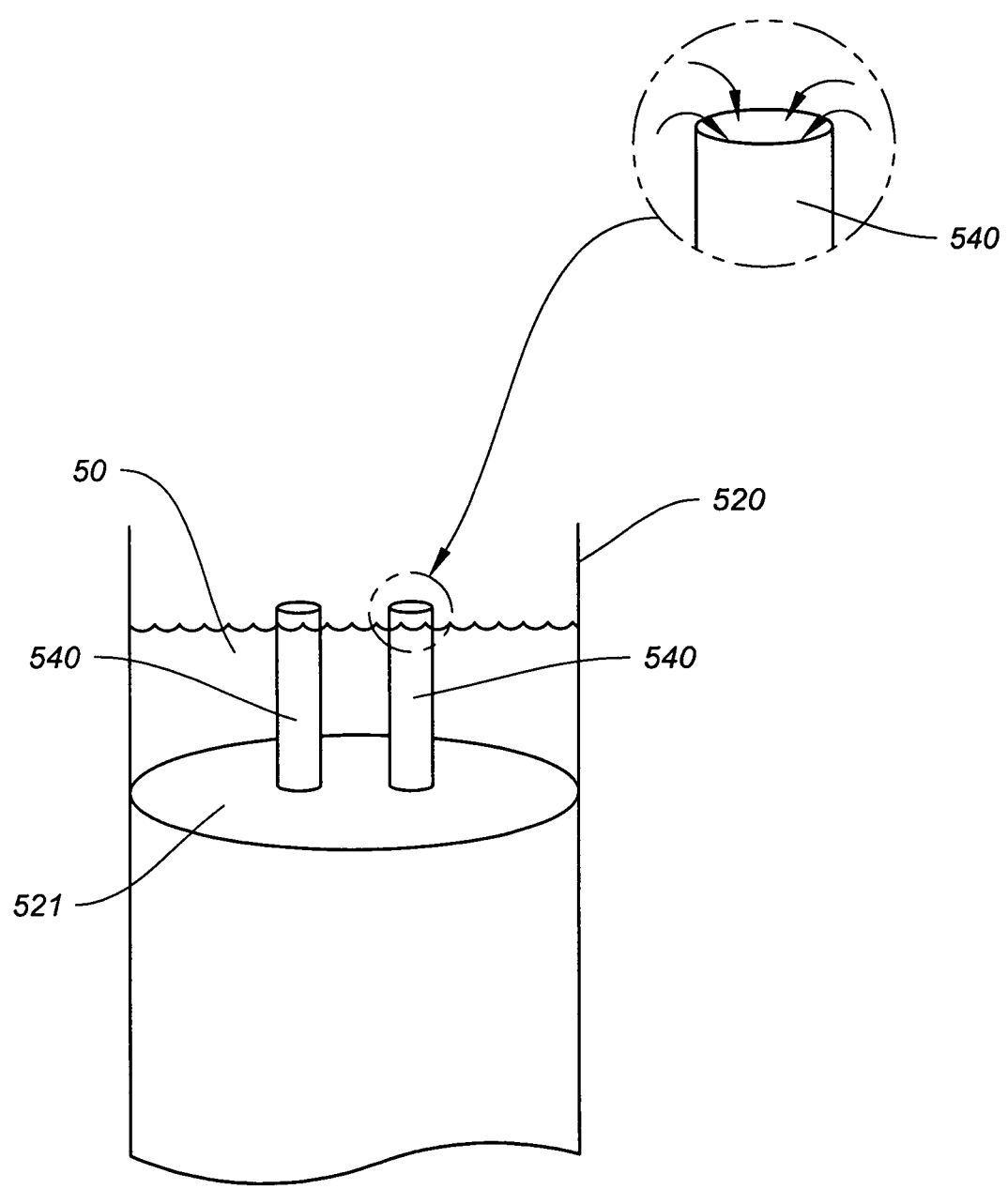
FIG. 4B illustrates two absorber tubes with their tops aligned.

FIG. 4B illustrates an absorber tube 540 design wherein the tops of tubes 540 are aligned horizontally, and solvent simply flows into the top of each tube as shown by the insert in FIG. 4B.

Figure 4C:
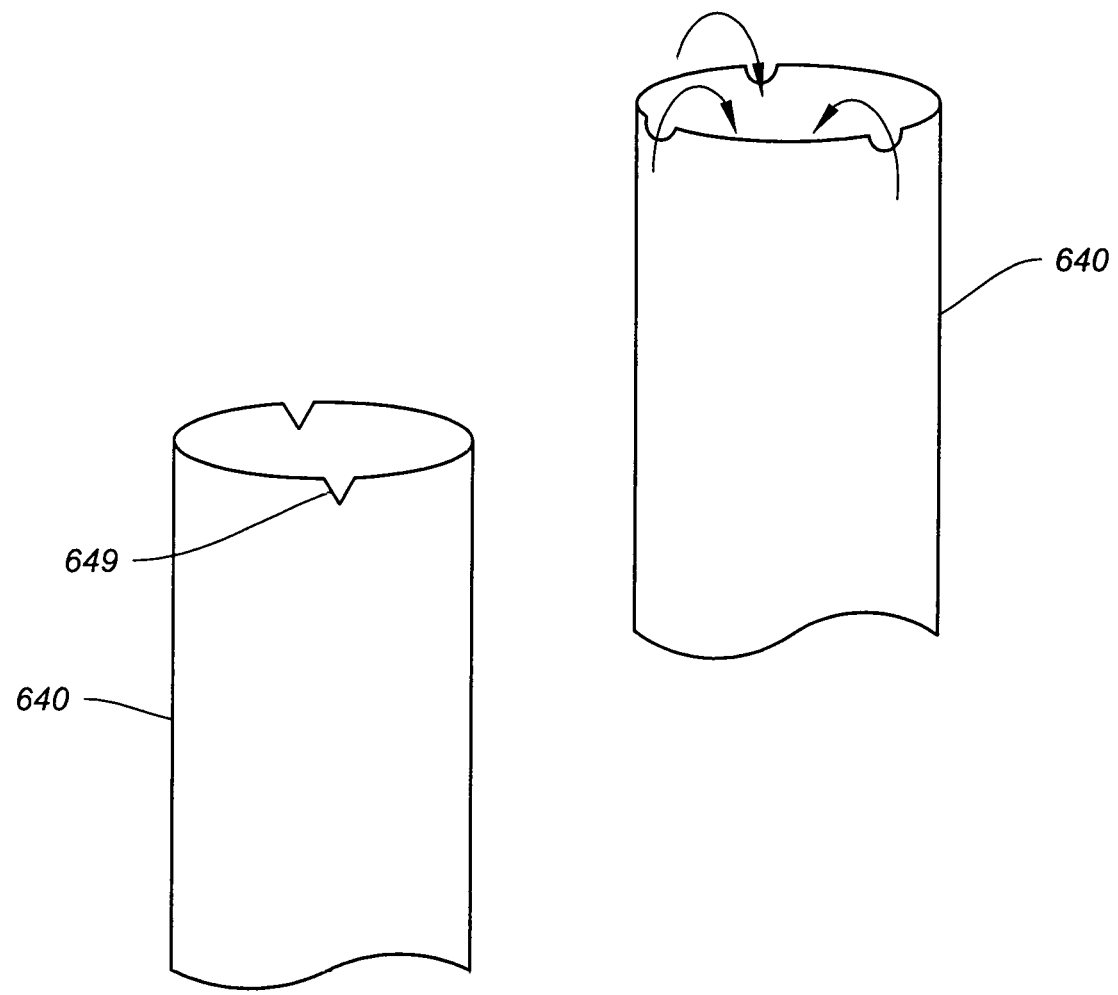
FIG. 4C shows an absorber tube with a notched top over which solvent flows.

FIG. 4C illustrates two absorber tubes 540 wherein notches are formed in the top of the tubes, allowing solvent to flow through the notches into the tube. Tubes 540 extend above bulkhead 521 in reaction vessel 520.

Figure 4D:
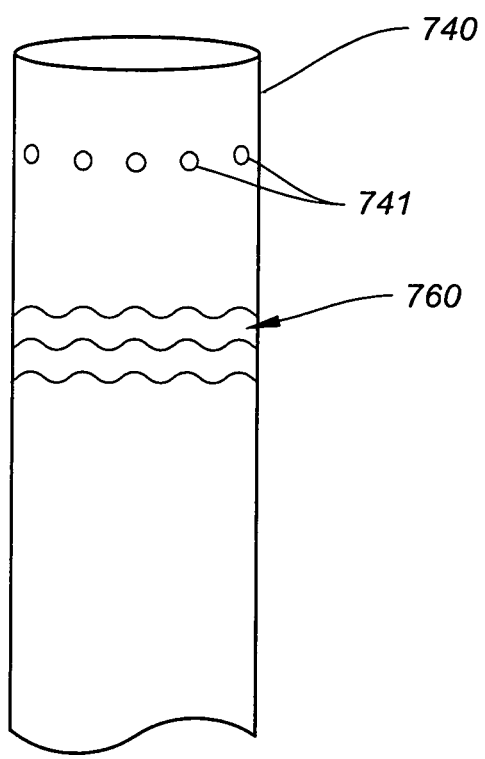
FIG. 4D shows an absorber tube with a series of holes formed on a horizontal line in its side wall through which solvent flows.

FIG. 4D illustrates a tube 740 with holes 741 formed in the side wall of the tube; solvent flows through holes 741 into the tube 740. A screen assembly 760 with three corrugated screens 761a, 761b and 761c is mounted inside tube 760 below holes 741.

Figure 4E:
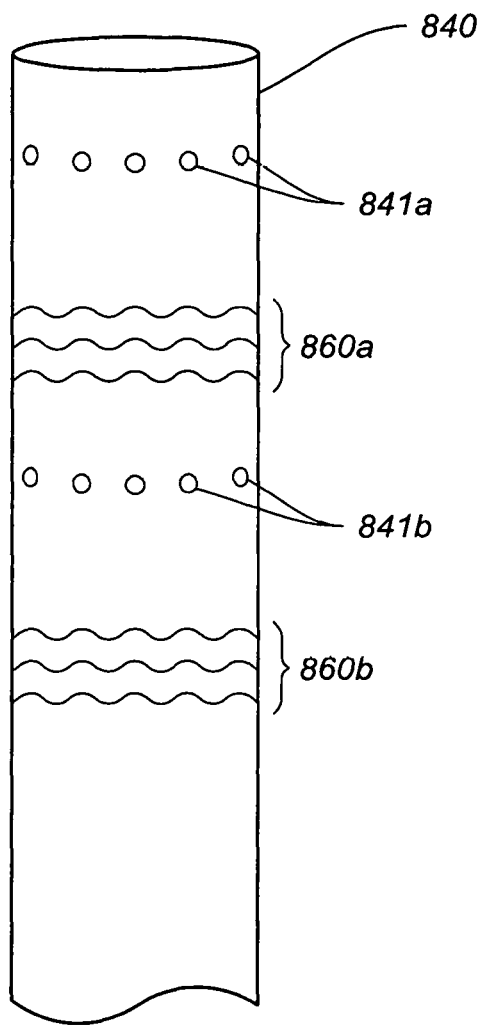
FIG. 4E shows an absorber with two horizontal, vertically spaced apart rows of holes.

FIG. 4E illustrates a tube 840 with two, horizontal, vertically spaced apart rows of holes 841a and 841b. Screen assemblies 860a and 860b are mounted inside tube 840 below rows 841a and 841b, respectively.

Figure 5:
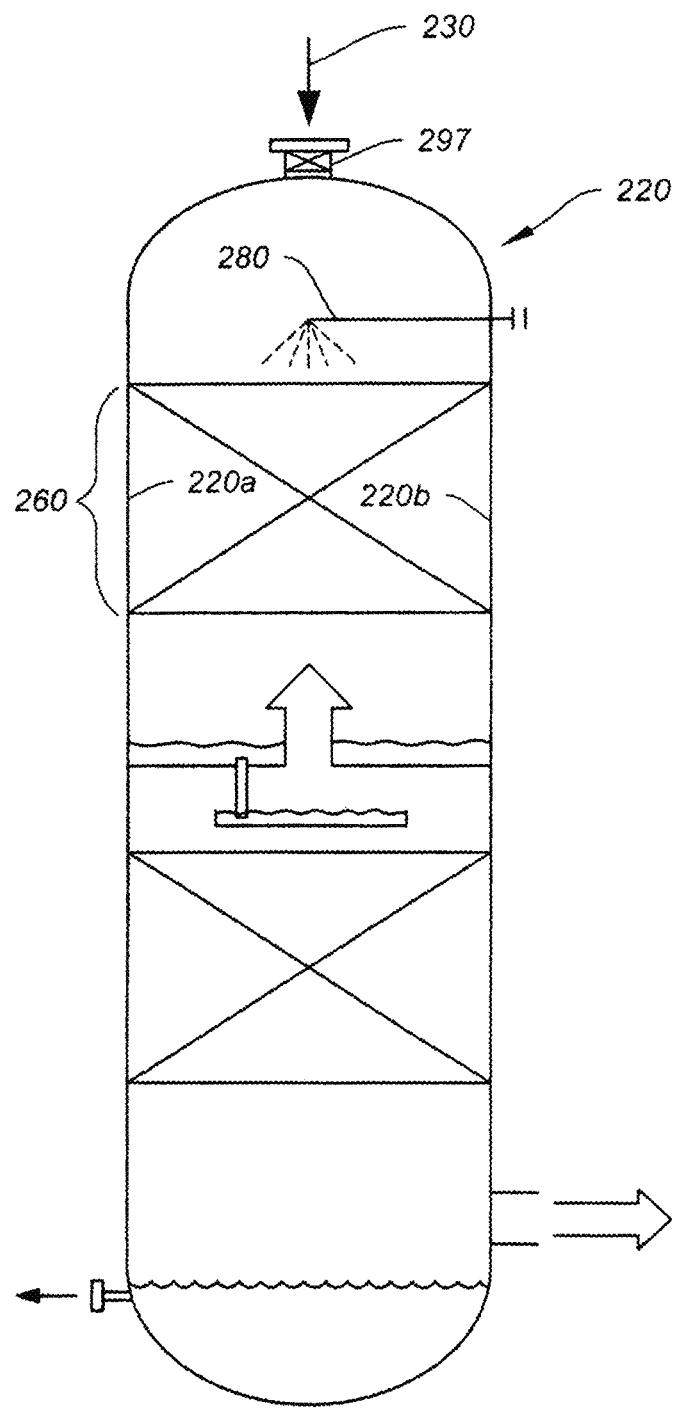
FIG. 5 is a schematic cross-section of an alternate absorber wherein "full diameter" screen packs are utilized.

FIG. 5 illustrates another embodiment in which the tubes may be replaced altogether with continuous packs of corrugated and/or flat and/or substantially rectangular wave shaped screens which fill the full diameter of the absorber vessel. These "packs" are held in place by supporting rings and grids and solvent are dispersed evenly on to the top of the packs using any one of a number of conventional liquid distributors. This embodiment is referred to as herein as the "Full Diameter Screen" embodiment.

FIG. 5 shows a vertical reaction vessel 220 through which a gas stream 230 flows downwardly. Rather than using the array of absorber tubes 40 as shown in FIG. 1, the embodiment shown in FIG. 5 uses "screen packs" 260 in which the individual screens extend from side wall 220a to side wall 220b. A liquid distributor 280 distributes solvent evenly over the top of "screen pack" 260. In other respects the absorber vessel 220 is the same as vessel 20 of FIG. 1. Fan 297 pressurizes gas 230 as it flows through vessel 220.

Figure 6:
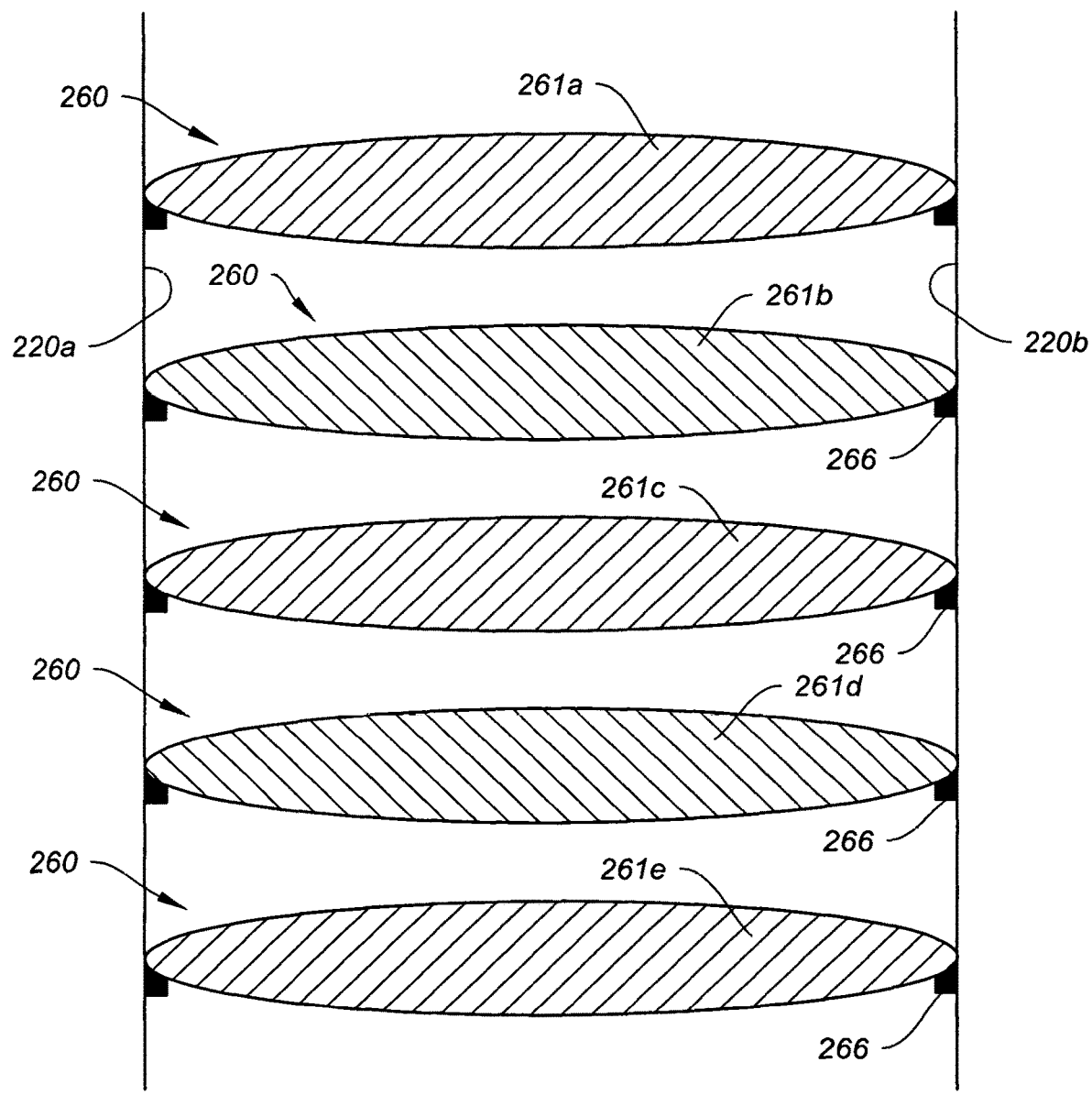
FIG. 6 shows a screen pack utilized in the absorber of FIG. 5.

FIG. 6 shows schematically how "screen pack" 260 is positioned between walls 220a and 220b of vessel 220 shown in FIG. 5. Each of the screens 261a-261e is corrugated preferably and the axes of corrugation are offset as much as 90° from adjacent screens. Screens 260 are held in place by supports 266.

Figure 7:
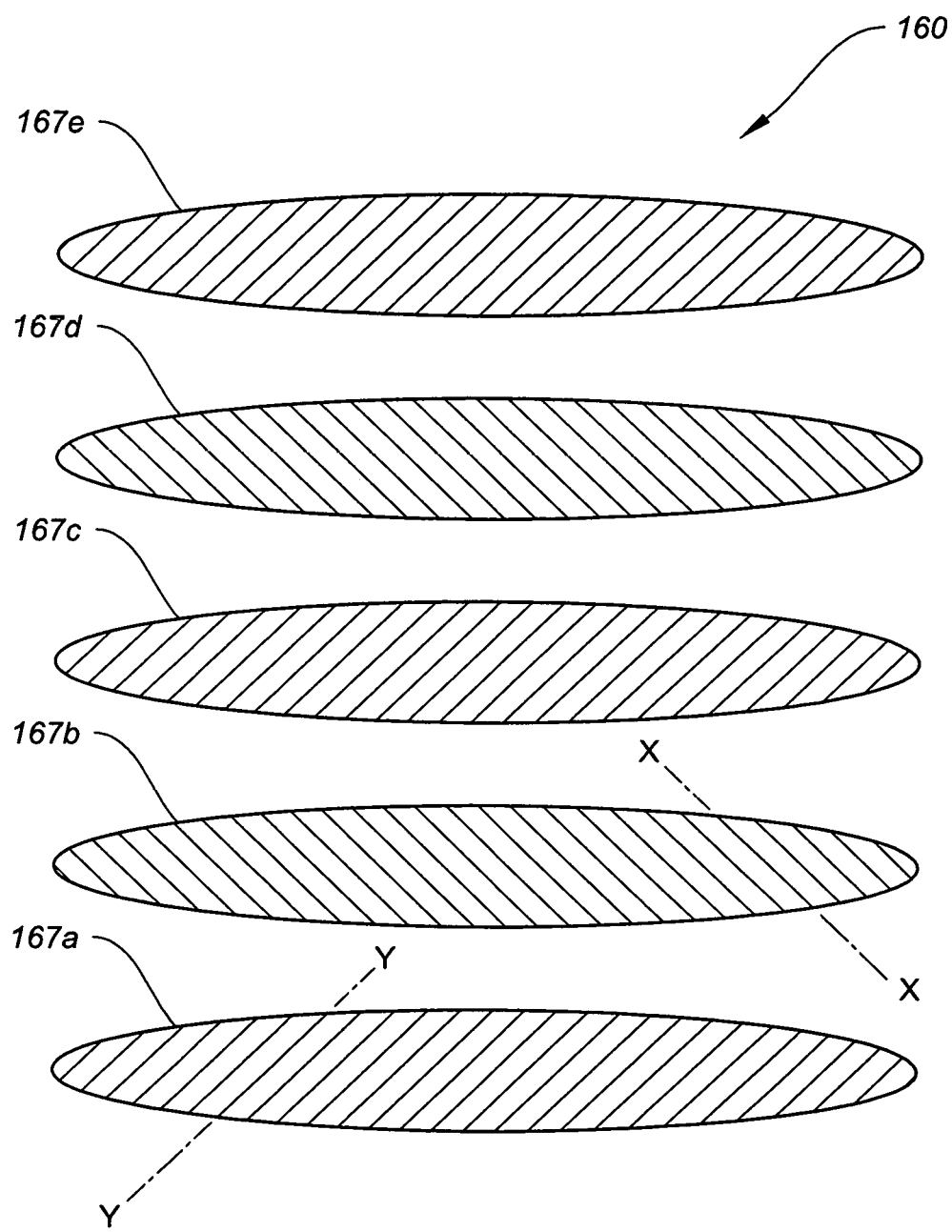
FIG. 7 shows a plurality of corrugated screens.

FIG. 7 shows a screen assembly 160 where corrugated screens 167a-167e are used. The assembly may consist of flat or corrugated screens or a combination of both types. It is significant to note that the axes of the corrugations in screens 167a-167e are rotated relative to each other. For example, the axis X-X of the corrugations of screen 161b is rotated counter-clockwise about 45° relative to the axis of corrugations Y-Y of screen 161*a*. Adjacent screens are preferably offset or rotated so that their axes of rotation are offset between 45° and 90°, and most preferably from 60° to 80°.

Figure 8:
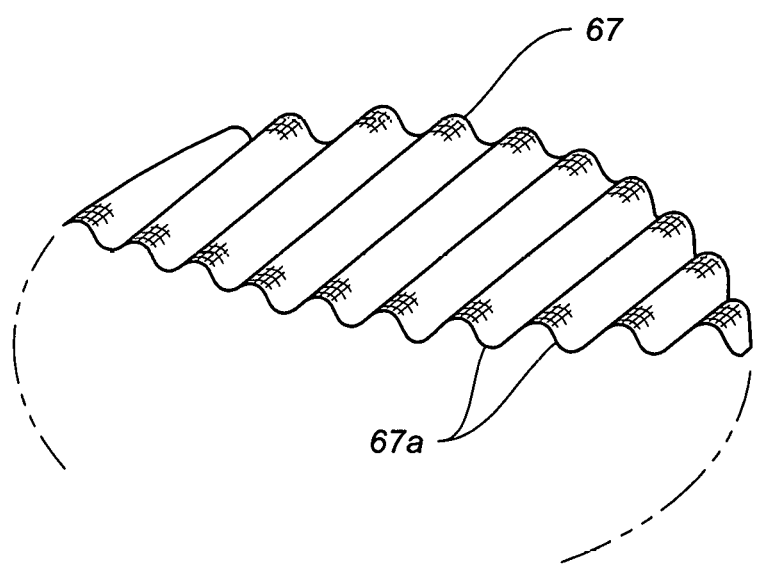
FIG. 8 shows a single corrugated screen.

FIG. 8 is a perspective view of a single, circular, corrugated screen 67 that may be used in the screen assembly 160 of FIG. 7 or assembly 260 of FIG. 6. Screen 67 has a sinusoidal cross section 67*a*.

Figure 9:
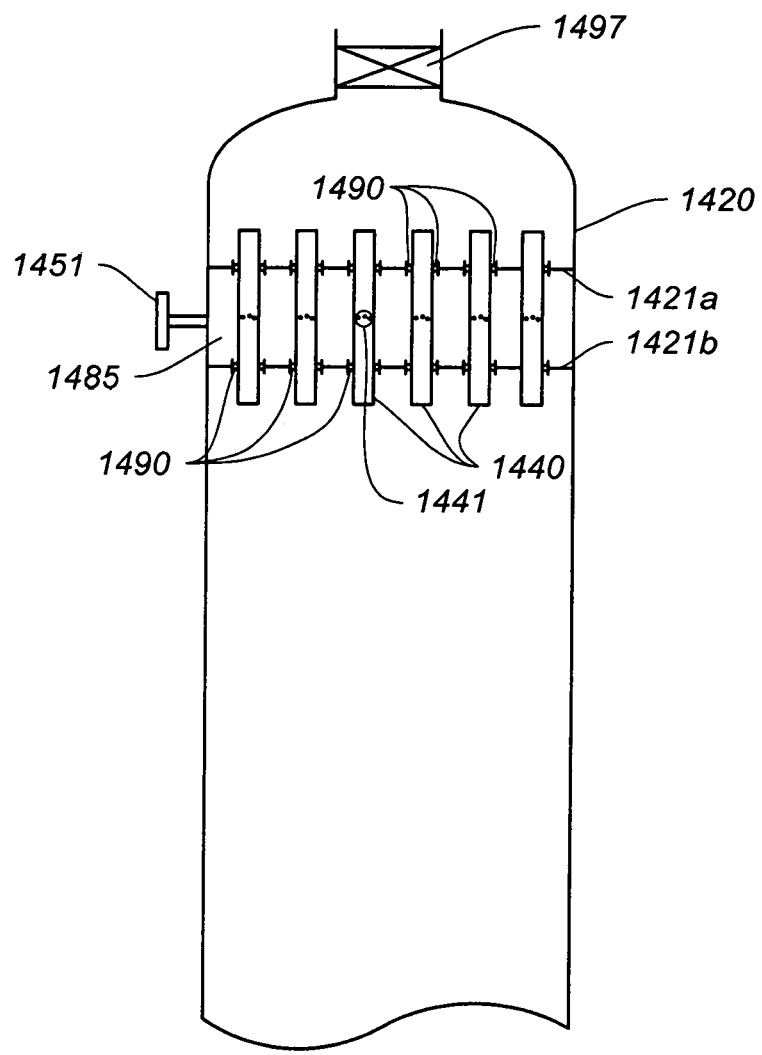
FIG. 9 illustrates an alternate absorber design utilizing pressurized solvent.

FIG. 9 illustrates an alternate embodiment wherein a vertical arrangement of absorber tubes 440 in FIG. 8 can be modified for use as shown by tubes 1440 with the vertical vessel 1420 shown in FIG. 9. O-ring seals (or other seals known in the art) 1490 are either placed or welded between each absorber tube 1440 and bulkhead plates 1421*a* and 1421*b*. The chamber 1485 between bulkhead plates 1421*a* and 1422*b* is pressurized. Pressurized lean solvent is fed through line 1451 into chamber 1485 and into absorber tubes 1440 through openings 1441 formed in the walls of tubes 1440. Fan 1497 pressurizes vessel 1420.

The Solvent Pulsing Phenomenon

Figure 10A:
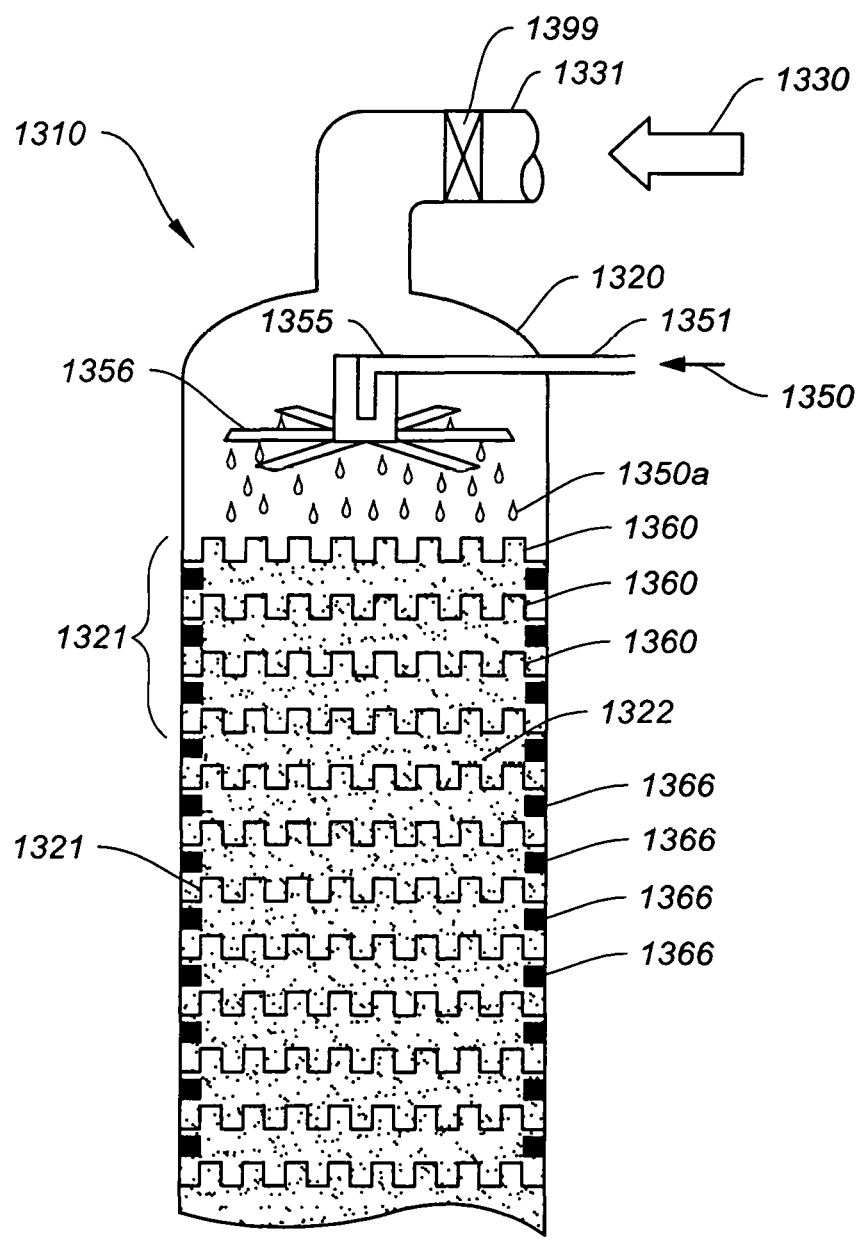
FIG. 10A is a schematic cross-section of an alternate embodiment wherein no absorber tubes or bulkhead plates are utilized; rather a conventional solvent distributor provides solvent to a plurality of spaced apart, square shaped screens.

FIG. 10A illustrates an embodiment of the invention wherein the solvent pulsing phenomenon is described. The absorber shown generally as 1310 includes a vertically extending, single chamber reaction vessel 1320. Only the upper portion of vessel 1320 is shown in FIG. 10A for clarity. The lower portion of vessel 1320 includes a solvent reservoir and outlet duct as shown in the lower portion of FIG. 1. Reaction vessel 1320 has an upper inlet 1331 into which incoming flowing gas stream 1330 flows. Fan 1399 pressurizes gas stream 1330 as it flows through vessel 1320. Gas stream 1330 flows downwardly through reaction vessel 1320 and is discharged through a lower outlet (not shown) similar to outlet 32 of FIG. 1 after being processed in reaction vessel 1320.

Incoming flowing gas stream is pressurized by any conventional fan 1399 or other known device.

Reaction vessel 1320 carries a plurality of vertically spaced apart, shaped screens 1360, each having preferably substantially rectangular wave cross-sections, wherein each screen extends transversely across said reaction vessel. The screens extend from sidewall 1321 to side wall 1322 and extend completely across the cross section of reaction vessel 1320. The screens are vertically spaced apart by spacers 1366. The screens are shown aligned for clarity, but may be offset in relation to each other. Screens 1360 may have substantially square cross-sections or other screen designs shown herein.

A solvent injector 1355 mounted inside vessel 1320 near the top of the vessel distributes a liquid solvent 1350 that is fed in through inlet line 1351. As shown in FIG. 13A, the distributor has a spider type head 1356 which distributes liquid solvent 1350*a* downwardly into reaction vessel 1320.

The liquid solvent 1350*a* flows downwardly through reaction vessel 1320 co-currently with gas stream 1330.

The interaction of the incoming gas stream 1330 with the liquid solvent 1350*a* and screens 1360 creates an aqueous bubbly froth being intermixed with numerous micro-droplets formed from causing bubbles in the froth to burst, as described generally above and described in detail in U.S. Pat. No. 7,854,791 and is not described or shown here for the sake of brevity and clarity.

Figure 10B:
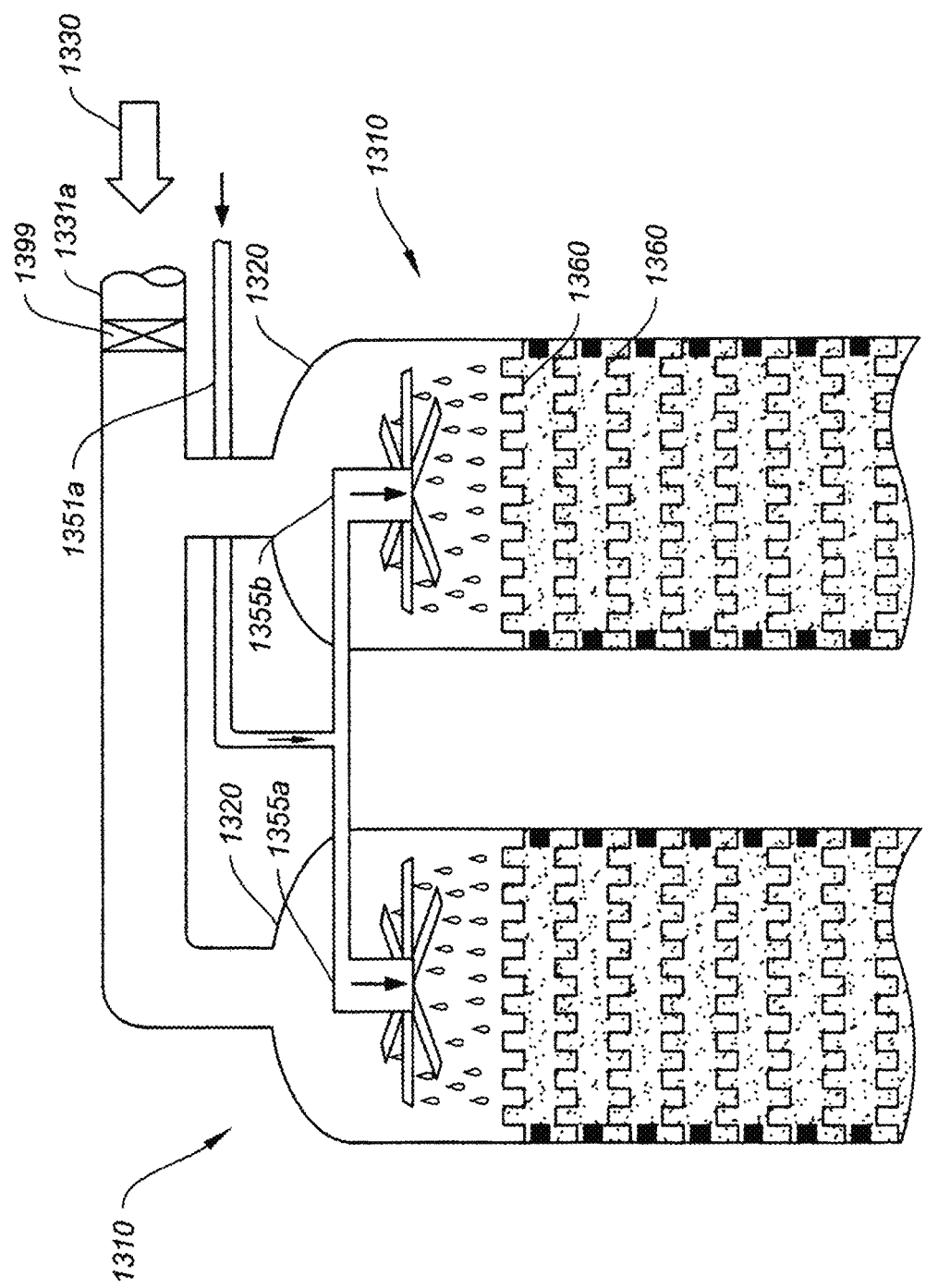
FIG. 10B illustrates the use of two reaction vessels of FIG. 10A fed by a common inlet duct.

FIG. 10B illustrates the upper portion of two reaction vessels identical to reaction vessel 1320 of FIG. 10A fed by a common inlet duct 1331*a*. Solvent distributors 1355*a* and 1355*b* are identical to distributor 1355 of FIG. 10A, and are fed solvent 1350*a* by feed line 1351*a*. FIG. 10B shows that an array of absorbers such as absorber 1310 of FIG. 10A may be fed an incoming gas stream and solvent from common ducts and feed lines. Fan 1399 pressurizes gas stream 1330.

We have found that by utilizing shaped screens having preferably substantially rectangular wave cross sections, together with certain flow rates of the incoming gas stream, we have identified and we have been able to induce and maintain the phenomenon described herein as "solvent pulsing." This phenomenon is illustrated schematically and described below and is used in the absorbers shown in FIGS. 10A and 10B. Solvent pulsing can also be used as an optional feature in all of the absorbers described herein.

FIGS. 11A-11F—are concept sketches, not to scale that illustrate the "solvent pulsing" phenomenon created in the upper portion 1321 illustrated in FIG. 10A. A section of screens 1360 near the top of reaction vessel 1320 are shown in 11A-11F. The screens 1360 are shown as being aligned for clarity, but are preferably offset as described herein. The screens shown in FIG. 10B use screens having substantially square cross sections.

Figure 11A:
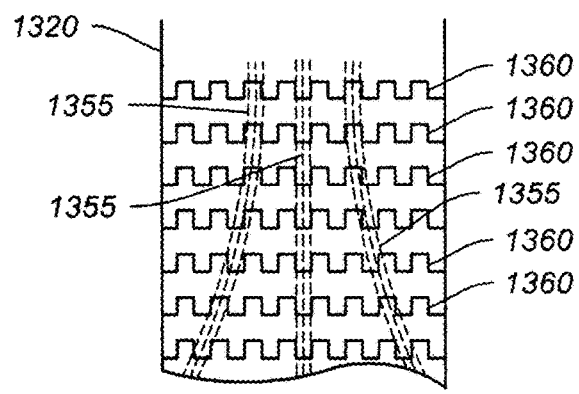
FIGS. 11A-11F illustrate the technique of "solvent pulsing" with the dynamic, rapidly changing absorption surface.

FIG. 11A illustrates solvent flow 1355 initially in the system. It is a trickle of solvent flowing down the column in a laminar fashion.

Figure 11B:
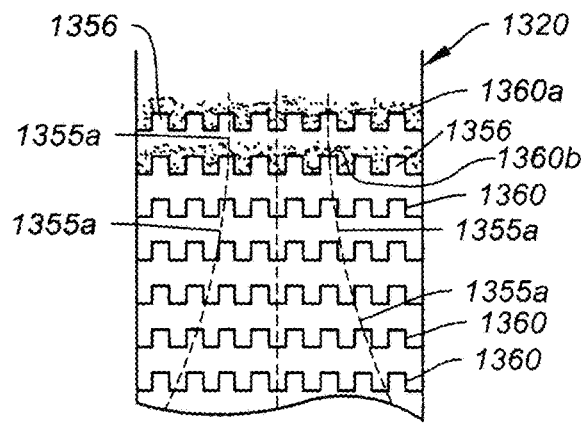

FIG. 11B illustrates the beginning of solvent froth accumulation 1356 beneath the tops the screens 1360*a* and 1360*b*. Accumulation occurs near the very top of the column and solvent flow rates 1355*a* decrease as a portion of the flowing solvent accumulates.

Figure 11C:
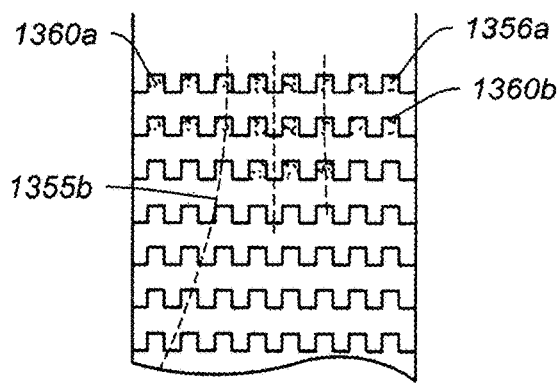

FIG. 11C illustrates a near saturation of screens 1360*a*, 1360*b* with solvent froth 1356*a*, with the lowest solvent flow rate 1355*b*.

Figure 11D:
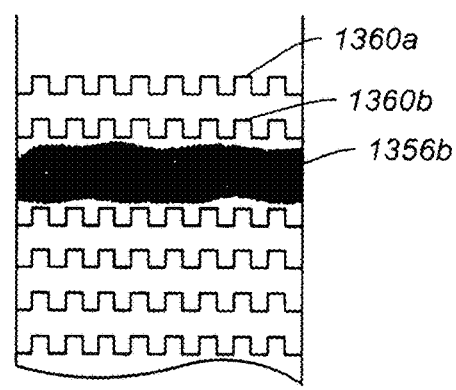

FIG. 11D illustrates all the accumulated solvent 1356*b* being released abruptly from screens 1360*a* and 1360*b* and traveling downstream in a high velocity turbulent solvent pulse 1356*b*. We have observed that often the "solvent pulsing" will occur across the entire width of screen 1360, as shown in FIG. 11D. We describe such a pulse as a "solvent plug pulse" since it extends across the screen 1360 and moves downwardly through the reaction chamber as a "plug." Multiple "plugs" will be moving downwardly through the reaction chamber simultaneously. These "plugs" prevent "channeling" in the reaction chamber as described below.

Figure 11E:
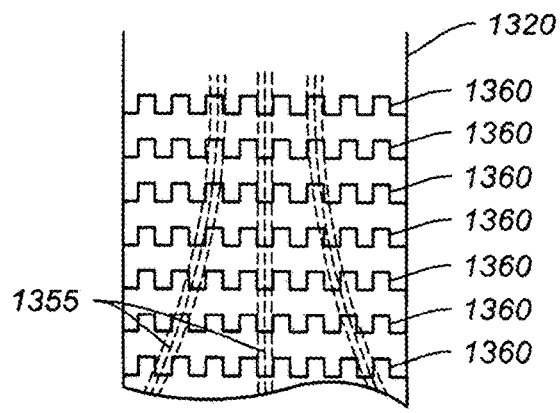

FIG. 11E illustrates flow returning to a similar fashion as in FIG. 14A; once again a trickle of laminar solvent.

Figure 11F:
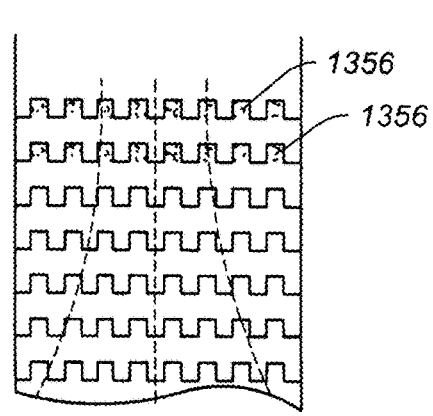

FIG. 11F illustrates accumulation beginning again, as in FIG. 14B; and the cycle repeats itself.

Screens

The screens of the embodiments shown in FIGS. 10A and 10B are fabricated from woven wire mesh or screens. The cross-sectional area of the screens is arranged perpendicular to the vertical axis of absorber tube so that the gas and liquid flow through each screen in sequence. The preferably substantially rectangular wave shaped screens (shown in FIGS. 10A and 10B as substantially square wave shaped screens having vertical side walls, flat tops, and flat bottoms of equal length in order to reduce pressure drop and increase liquid-gas interfacial area. The linear axes of the screen mesh filaments are aligned at a 45 degree angle to the linear axis of the ridges as shown in FIG. 2 above. The preferred substantially rectangular-wave shaped screens increase liquid hold-up and introduce turbulence into the flow field. The square-wave screens enable pulsing of liquid structures, aeration of the liquid pulses, and froth matrix formation. The linear axes of the screen filaments of each screen are rotated between 45° to 90°, and preferably between 60° and 80°, in reference to the linear axis of the ridges of each upstream screen in order to keep the liquid phase distributed evenly over the cross-sectional area of the screens throughout the reaction chamber. The closely-spaced screens reform the reactant surfaces at high frequency in order to maximize fresh reactant surfaces exposed to the target gas.

In the embodiment of FIG. 10A, an assembly of ten (10) substantially rectangular-wave shaped screens with 12×12 openings/square inch, 0.055" apertures, 0.028" wire diameter, and 44% open area are separated by thin annulus shaped spacers, 0.25" thick, that support the screens around the periphery of the absorber tube. The 'pulse-generation' screen assembly enables fluid hold-up in the screens and initiation of the pulsing of liquid structures through the reaction chamber at operational conditions.

The preferred substantially rectangular-wave shaped screens in the remainder of the reaction chamber have 12×12 openings/square inch, 0.060" apertures, 0.023" wire diameter, and 52% open area in order to propagate the pulses through the reaction chamber at lower pressure drop than pulse-generation screens and allow for optimal contact time between the gas and liquid phases.

Although screens with substantially square wave cross-sections are shown, screens with substantially rectangular cross-sections can also be used (See FIGS. 12-15).

How Pulsing and Regeneration are Achieved

Although overall liquid-gas molar flow rate ratios are comparable to conventional contactors, solvent volumetric flow rate in the absorber as described herein is not constant. Rather, solvent volumetric flow rate initially is low and a fraction of the solvent accumulates in the screens as described above. Upon reaching a critical saturation, a large fraction of the accumulated solvent travels downstream at high volumetric flow rate in a pulse. After the pulse, the solvent volumetric flow rate is low again until another pulse occurs. This repeats ad infinitum.

We have derived the following working parameters for achieving or inducing, and maintaining solvent plug pulsing for all embodiments:
Gas stream flow rates—>0.5 m/s, with preferred rate 1.25 to 3.5 m/s
Molar liquid/gas ratio—>2
Screen opening size—0.040" to 0.150"
Wire diameter—0.020" to 0.050"
Spacing between screens—0.25" to 1.50"
Square wave height—0.25" to 0.75"
Screen Specs for Pulsing:
  Openings/sq. in, wire diameter, opening size, open area ratio
    12×12-0.028"-0.055"-44%
Pulse Frequencies at 2.5 m/s Vgas:
  Generation frequency—between 1 and 20 per second, preferably between 2 and 10 per second
  The tiers of screens are sized and spaced to cause reformation of the solvent froth between 20 and 100 times per second, and preferably between 40 and 80 times per second. Such reformation is caused by solvent plug pulses passing through each tier of screens.

This pulsing is beneficial because at flow rates and liquid-gas ratios similar to that of conventional columns the Reynolds number for the liquid places it squarely in the laminar regime. However, because the absorber experiences the pulsing phenomenon, it greatly increases the volumetric flow rate during a pulse bringing it more in line with turbulent flow. There exists numerous literature that show turbulent flow causes better mixing, which increases the rate of mass transfer. Furthermore, high speed photography shows pulsing enhancing the formation of micro-froth. Literature also exists that show froth and bubble structures enhance contact area. The use of co-current flow and the geometry of the screens allow for these important solvent pulses to occur.

Screen Specs. for Propagation:
12×12 openings/square inch, 0.023" wire diameter, 0.060" opening size, 52% open area ratio
Approximately (4) ridges/inch across the diameter of the screens: ⅛" ridges and ⅛" valleys
e.g.—4" diameter screen has 16 ridges
Ridge height . . . 0.275"-0.375"
Screens separated by 0.25" spacers FIGS. 12-15 illustrate various preferred cross-sectional screen designs having a substantially rectangular cross-section which will cause "solvent pulsing" under proper conditions.

Figure 12:
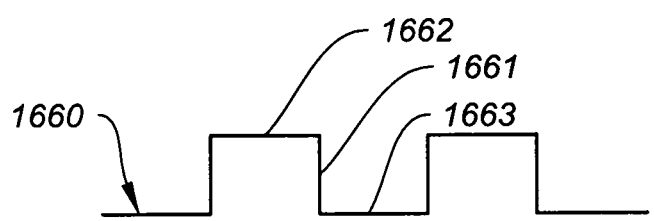
FIGS. 12-15 illustrate various screen cross-section designs which may be utilized with absorbers described herein.

FIG. 12 is a square wave pattern, with the side walls 1661 of the same length as the generally horizontal tops 1662 and bottoms 1663.

Figure 13:
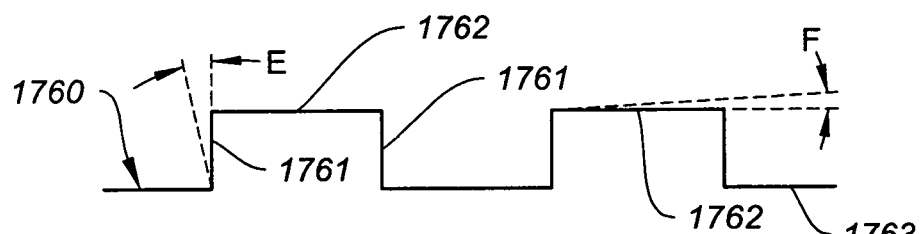

FIG. 13 shows screen 1760 with a rectangular pattern with side walls or vertical segments 1761 having a smaller length than the tops 1762 or bottoms 1763. Angle E in FIG. 13 (not to scale) illustrates that side walls 1761 may be inclined slightly, plus or minus 5°, relative to the direction of flow of the gas stream, which in FIG. 13 is parallel to sidewall 1761. Similarly, angle F (not to scale) illustrates how tops 1762 and bottoms 1763 may be inclined slightly, plus or minus 5°, relative to a plane perpendicular to the gas stream flow direction, such plane shown by horizontal tops 1762 and horizontal bottoms 1763.

Figure 14:
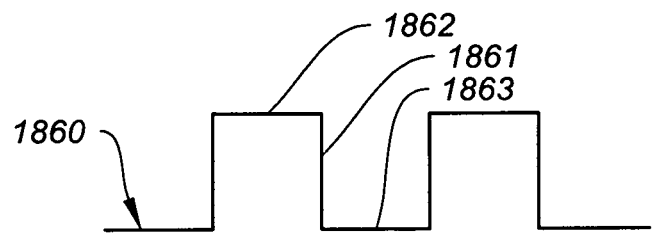

FIG. 14 shows screen 1860 with a rectangular pattern wherein side walls 1861 are longer than horizontal tops 1862 and bottoms 1863.

Figure 15:
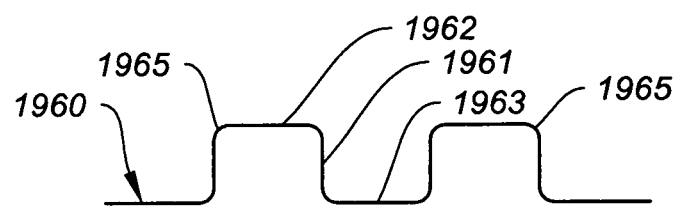

FIG. 15 shows screen 1960 having rounded corners 1965 between side walls 1961, horizontal tops 1962 and bottoms 1963.

It is to be understood that FIGS. 12-15 are by way of example, and numerous other shaped screens may be utilized. We have found that the most preferred screen shape for inducing "solvent pulsing" is the "substantially rectangular or square wave cross section" shown in FIGS. 10A, 10B, 12, 13 and 14. We believe the corners formed between the top surface of each wave and the side walls extending downwardly there from form a "first region" of the screen to which the froth adheres momentarily (see FIG. 16C). Also, the bottoms of each square wave form a "second region" which allows the gas stream to increase in velocity, as the first region limits flow (see FIG. 16C). If the flat tops and bottoms are within five degrees (5°) of being perpendicular to the flow direction of the gas stream, and if the sidewalls are flat and within five degrees (5°) of the flow direction of the gas stream, we are able to induce and maintain "solvent pulsing" reliably. Utilizing screens having "substantially rectangular or square wave cross section" with proper design and gas stream flow rates, "solvent pulsing" can be induced and maintained in the embodiments shown in FIGS. 1, 5, 9, 10A, 10B and 20.

If the side walls form an angle A between 5° and 20°, what we define as a "ridge shaped screen" is formed, and "solvent pulsing" is more difficult to induce and maintain, but even without "solvent pulsing," higher levels of efficiency can be attained than in prior art absorbers.

FIGS. 16A-16F illustrate how the pulsing occurs.

FIGS. 16A-16F illustrate the "solvent pulsing" phenomenon created in screens 1360 illustrated in FIG. 10A. A single screen 1360 is shown in FIGS. 16A-16F as a solvent pulse is created in that single screen.

Figures 16A, 16B, 16C, 16D:
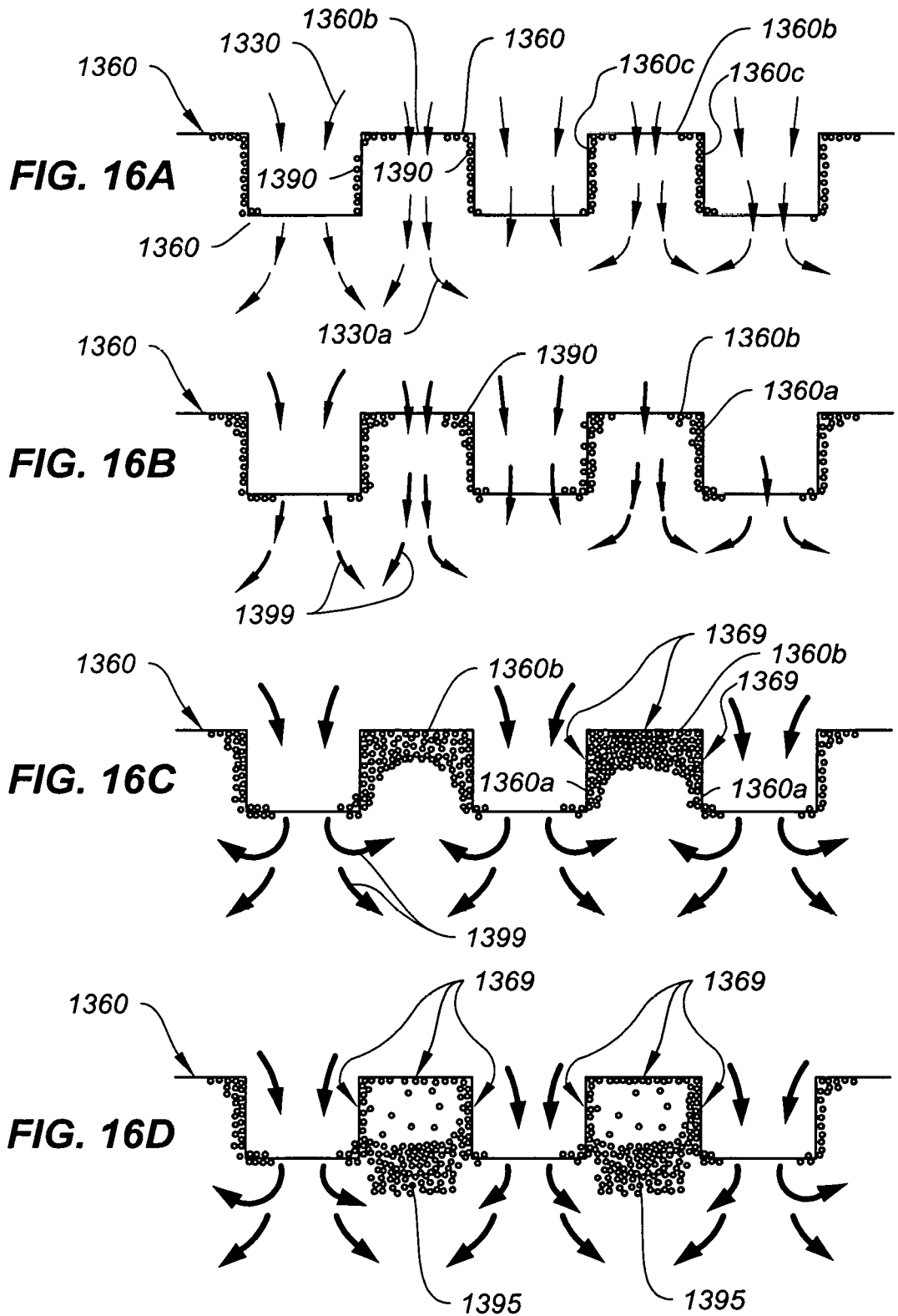
FIGS. 16A-16F illustrates how solvent accumulates on the screens and how solvent pulses are created.

As shown in FIG. 16A, screen 1360 is referred to herein and in the claims as a "shaped screen having a substantially rectangular cross-section." As shown in FIG. 16A, screen 1360 includes flat tops 1360b, flat bottoms 1360a, and flat side walls 1360c, which may be of equal length. As shown in FIG. 16A, screen 1360 has vertical regions 1360A that extend in a vertical direction, parallel with (or within 5° of) the direction of gas stream 1330. In addition, regions 1360b of the surface of screen 1360 have a surface extending in a direction transverse or perpendicular (or within 5° of transverse or perpendicular) to the direction in which gas stream 1330 flows.

FIG. 16A illustrates the first step in the "solvent pulsing" phenomenon. Aqueous froth comprising solvent bubbles and micro-droplets is accumulating, or holding up, below the top surface 1360b of each square wave. Gas stream 1330 is flowing at a normal velocity through the tops 1360b and bottoms 360a of each square wave. Gas flow 1330a below or downstream of screen 1360 is turbulent.

As shown in FIG. 16B, more solvent froth 1390 accumulates on first regions of each screen, those regions being the outer edges of the top 1360b restricting the available opening at the center of each top 1360b through which the gas stream flows. This in turn causes the velocity of incoming gas stream 1330 to further increase, as shown by larger boldness of the arrows 1399 illustrating the flow of gas stream 1330. Turbulence of gas stream 1330 below screen 1360 increases.

FIG. 16C illustrates maximum hold-up or accumulation of solvent froth on screen 1360. The solvent froth tends to accumulate beneath the top 1360b of each square wave, and along each side wall 1360c connected to top 1360b; this area is the "first region" of each screen in which the accumulation occurs. Gas velocity and turbulence below screen 1360 is maximized as gas if forced to flow only through second regions defined as the bottoms 1360a of each square wave.

FIG. 16D illustrates the initial phase of "solvent pulsing." Clumps 1395 of solvent froth are abruptly and violently torn from beneath the top 1360b of each square wave and flow downwardly into the violent turbulence 1399 below screen 1360. The "solvent pulsing" shown in FIG. 16D maximizes 2 phase mixing between gas stream 1330 and solvent clumps 1395 and between gas stream 1330 and solvent bubbles and micro-droplets that are not part of clumps 1395.

Figure 16E:
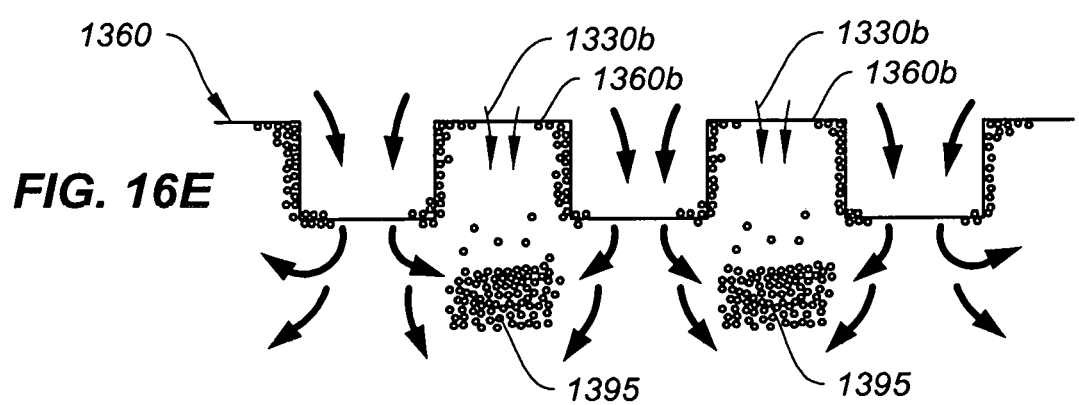

FIG. 16E illustrates the second phase of "solvent pulsing" wherein solvent froth clumps have moved downwardly below screen 1360 a sufficient distance that gas stream 1330b begins flowing through open regions near the center of tops 1360b. The clumps or pulses of solvent 1395 cascade downstream and increase solvent turbulence and 2 phase mixing downstream.

Figure 16F:
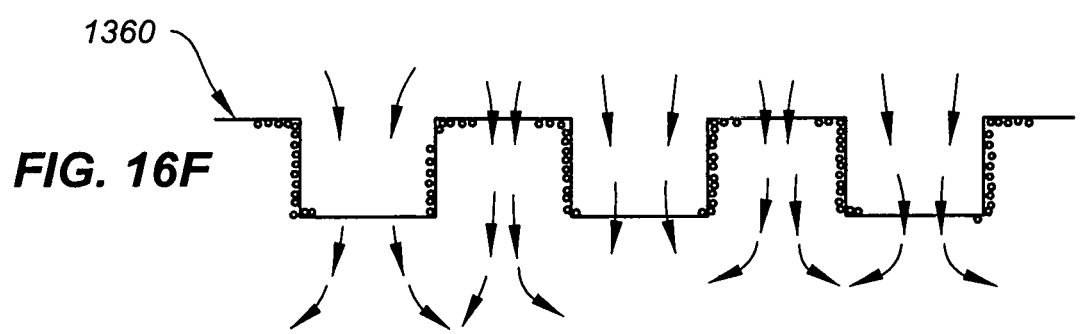

FIG. 16F illustrates the status of gas stream flow and solvent froth accumulation returning to the state shown in FIG. 16A after the solvent pulses or clumps 1395 have moved downstream. The cycle shown in FIGS. 16A through 16F repeats itself continually so long as the requisite conditions of gas stream flow and solvent froth flow remain in effect.

Figure 17:
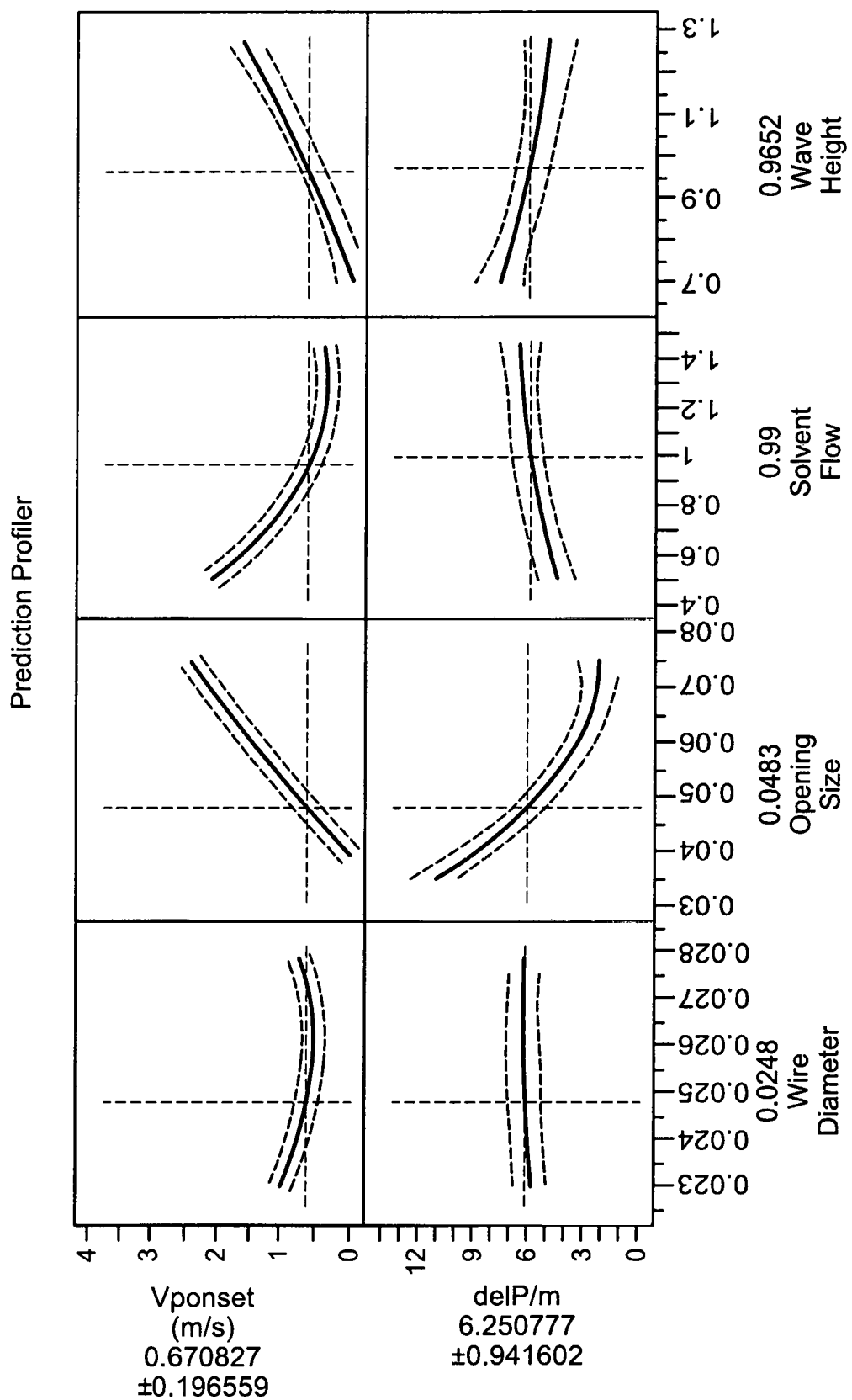
FIG. 17 is a graph illustrating screen parameters for inducing "solvent pulsing;"

As illustrated in FIG. 17, solvent pulse generation is controlled by a specific set of screens. The key process responses are the minimum gas velocity required to generate pulses (Vponset) and the pressure drop per unit packing depth (delP/m, measured in kPa/m). The critical screen parameters include screen opening size (in), the wire diameter (in) and the wave height size (cm). By "wave height," we mean the size of the sidewalls of each wave.

Figure 18:
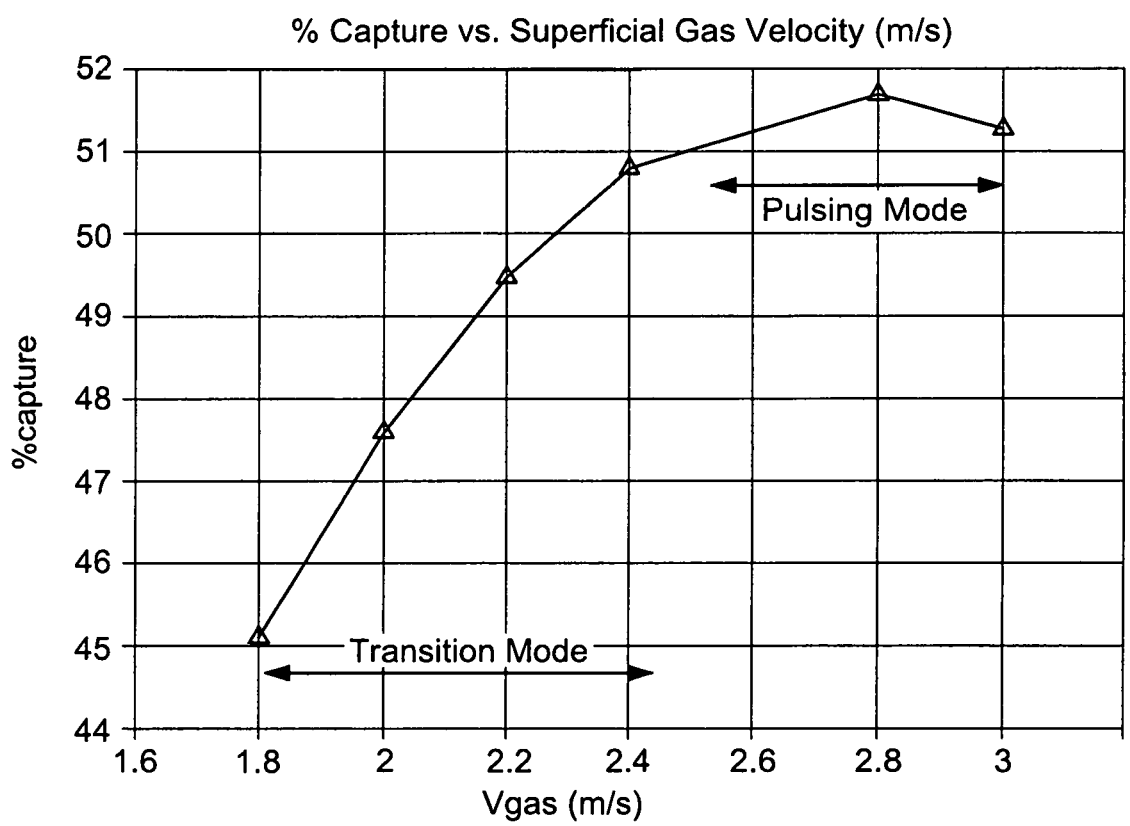
FIG. 18 is a graph illustrating the increased absorption efficiency when solvent pulsing is utilized, compared to a non-pulsing or trickle flow mode.

FIG. 18 below shows the relationship between the key process responses and the critical screen parameters. As shown by FIG. 18, the absorber operates in two major modes. Pulsing mode, described above and non-pulsing or trickle flow mode. There is a region between these two modes where the absorber operates in a transition mode with poorly defined pulses. The impact on mass transfer can be observed by FIG. 18. This data was generated using a 35% Sodium Glycinate solution running with a molar liquid to gas ratio of 5 in an absorber with 1.6 m of packing. The data shows the % $CO_2$ capture using an input $CO_2$ concentration of 9%. Normally it would be expected that higher % capture would be observed at lower gas velocity because there is more contact time between the target gas and the solvent but in this case, due to the poor pulsing characteristics at lower gas velocity, lower % capture is observed at lower gas velocity and the ideal best mass transfer occurs at higher gas velocity.

Figure 19:
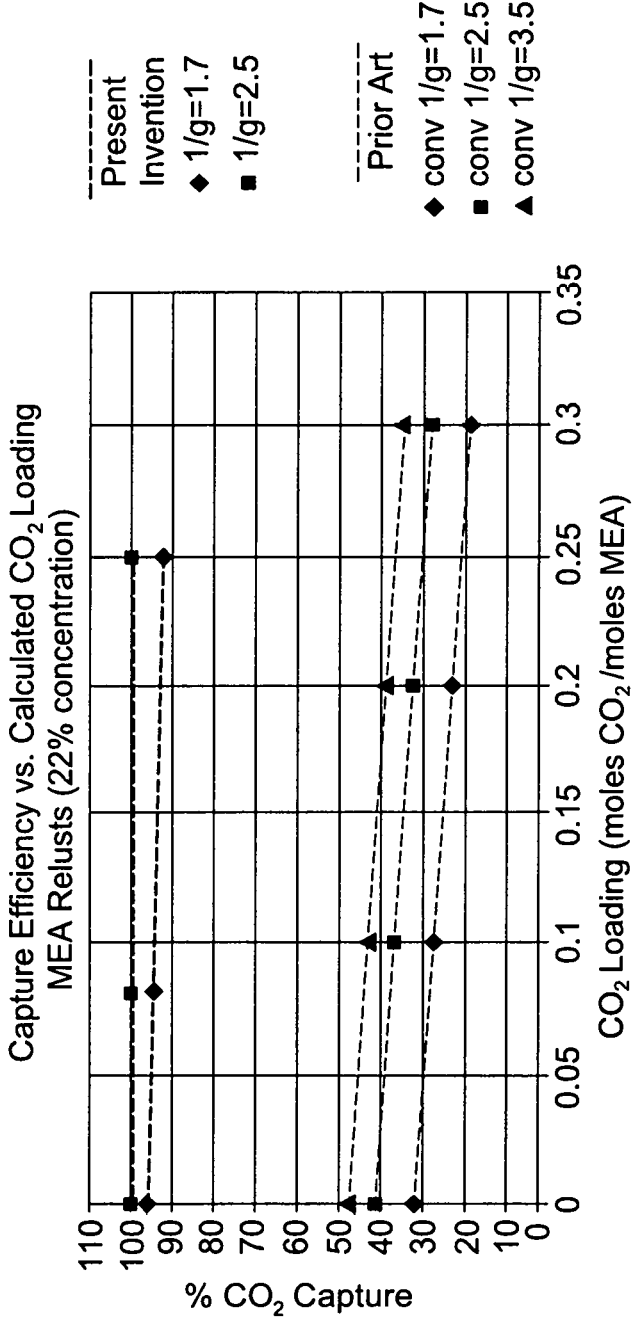
FIG. 19 is a graph illustrating increased efficiency of co-current flow utilized herein compared with prior art counter flow absorbers.

FIG. 19 compares the present absorber operating in Co-current pulsing mode to a conventional countercurrent absorber using Monoethanolamine (MEA) solvent. Even though the two absorbers are of comparable packing depth the present absorber demonstrates at least a 2× improvement in % capture.

Figure 20:
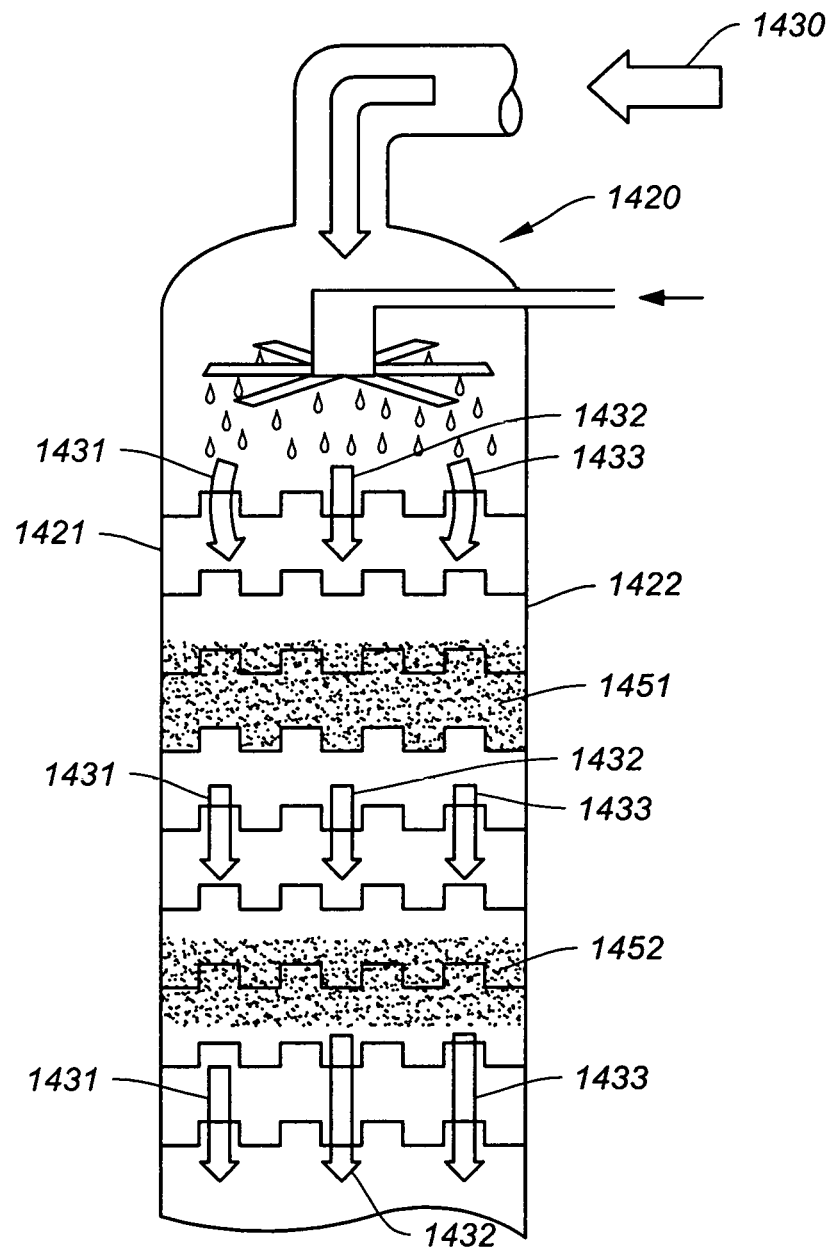
FIG. 20 is a schematic illustrating how "solvent plug pulses prevent channeling.

FIG. 20 is a schematic showing solvent plug pulses 1451 and 1452 moving downwardly through reaction vessel 1420. Since the plug pulses extend from sidewall 1421 to sidewall 1422, "channeling" of gas stream 1430 through vessel 1420 is prevented, i.e. the gas stream components 1431, 1432 and 1433 move downwardly at the same speed. The "plugs" 1451 and 1452 prevent any of the gas stream components from flowing at a much higher speed than other components, which is "channeling" and which substantially reduces efficiency.

Figure 21:
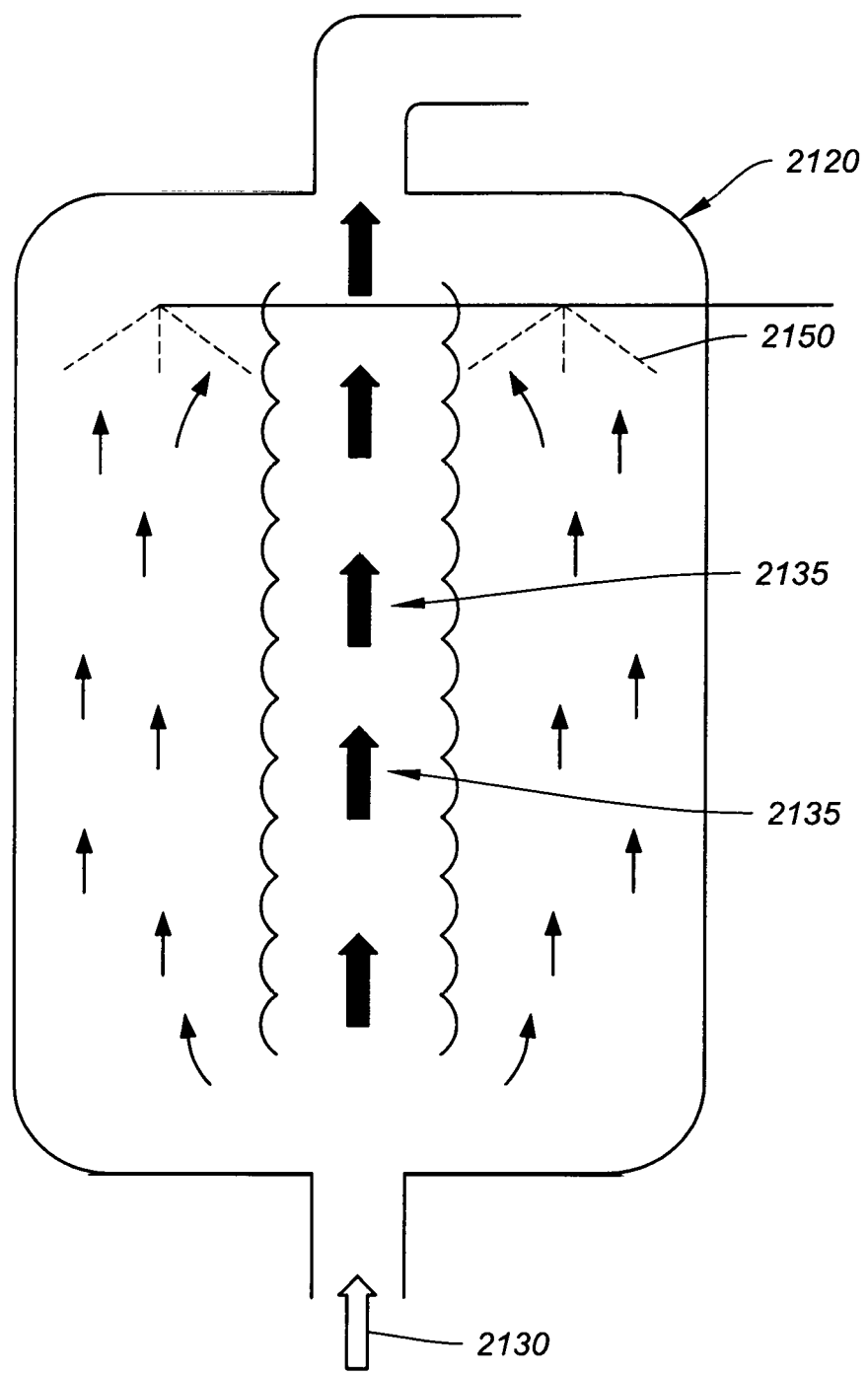
FIG. 21 is an illustration of the prior art problem known as "channeling;"

FIG. 21 is a schematic illustrating the prior art problem of "channeling." A counter-flow absorber 2120 is shown with gas stream 2130 flowing upwardly. Solvent 2150 is sprayed into the top portion of absorber 2120. The gas stream tends to follow the path of least resistance, resulting in a very high speed flow 2135 through the center of absorber 2120. The extremely high flow rate reduces efficiently greatly. The present invention eliminates this "channeling" problem.

Figure 22:
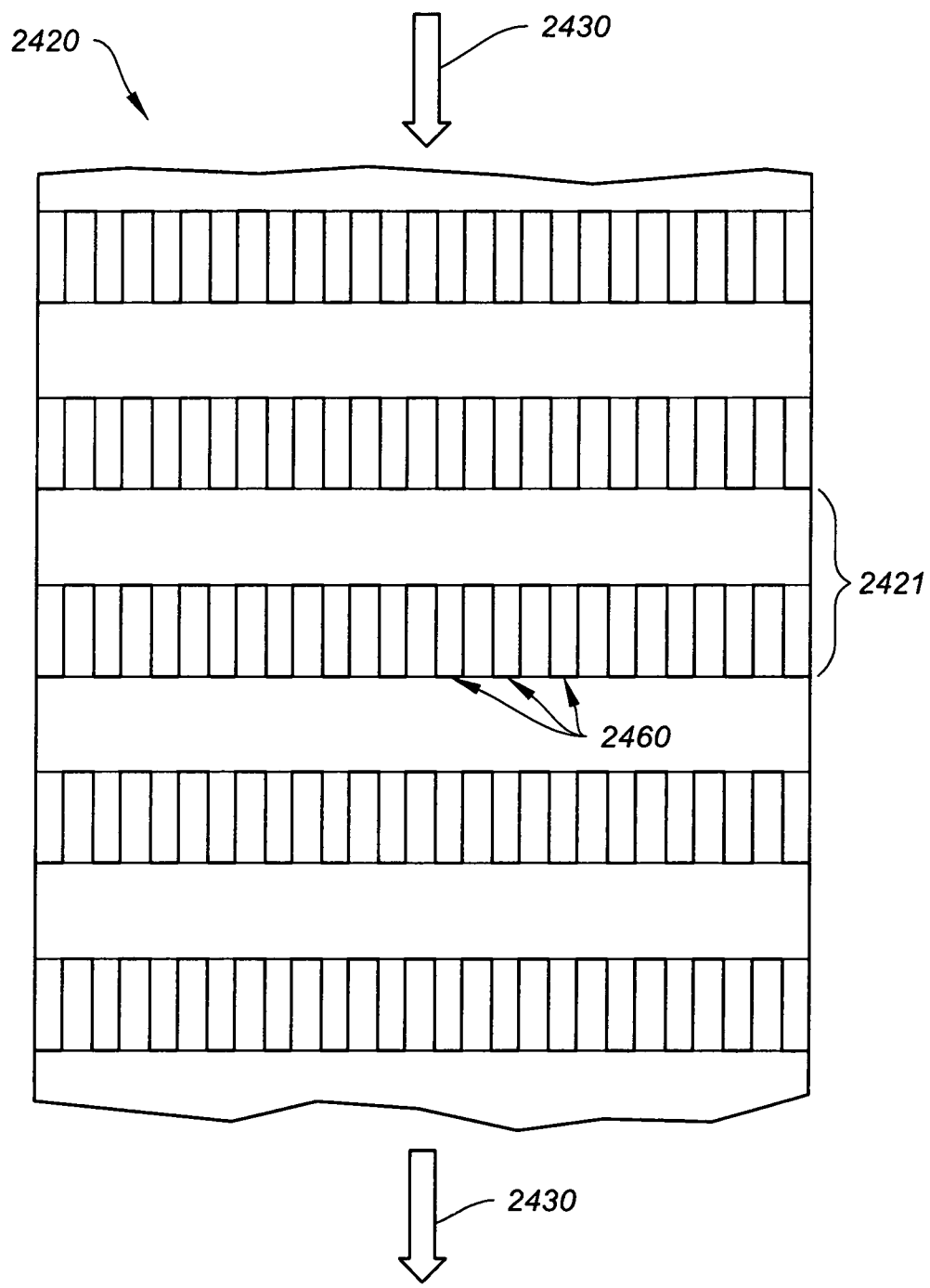
FIGS. 22 and 23 are photographs of an absorber of the present invention showing that when solvent froth accumulates on a screen, the froth occludes light being directed transversely through the absorber.
Figure 23:
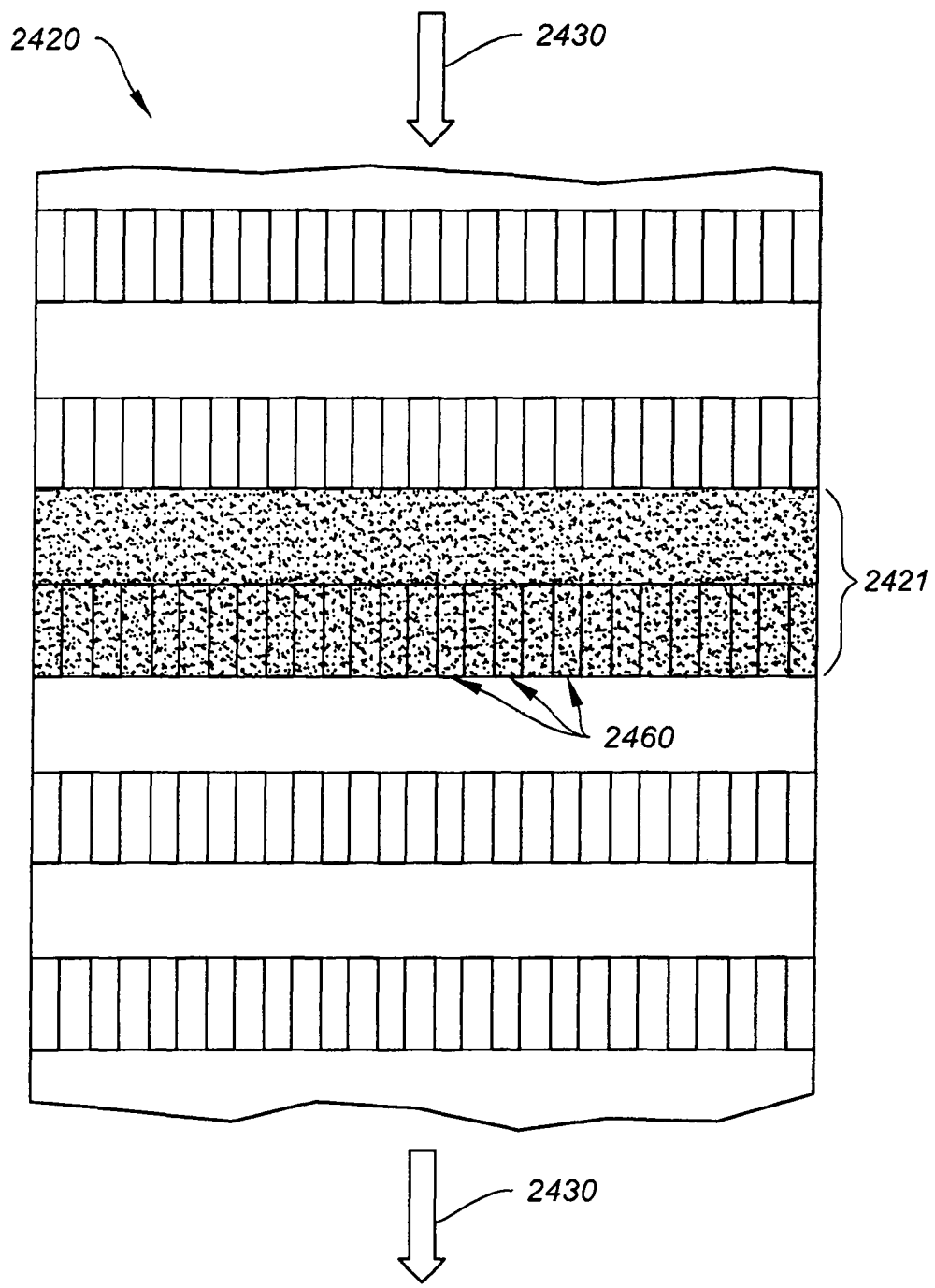

FIGS. 22 and 23 are sketches of photographs taken of an absorber 2420 of the present invention. The bright area 2421 in FIG. 22 represents a screen 2460 on which little or no solvent froth has accumulated; light flows through this section and screen 2460 easily. That same screen 2460 becomes dark, and does not transmit light easily as shown in FIG. 23, as solvent froth plus pulse 2470 accumulates on screen 2460. Gas stream 2430 flows downwardly through absorber 2420.

Figure 24:
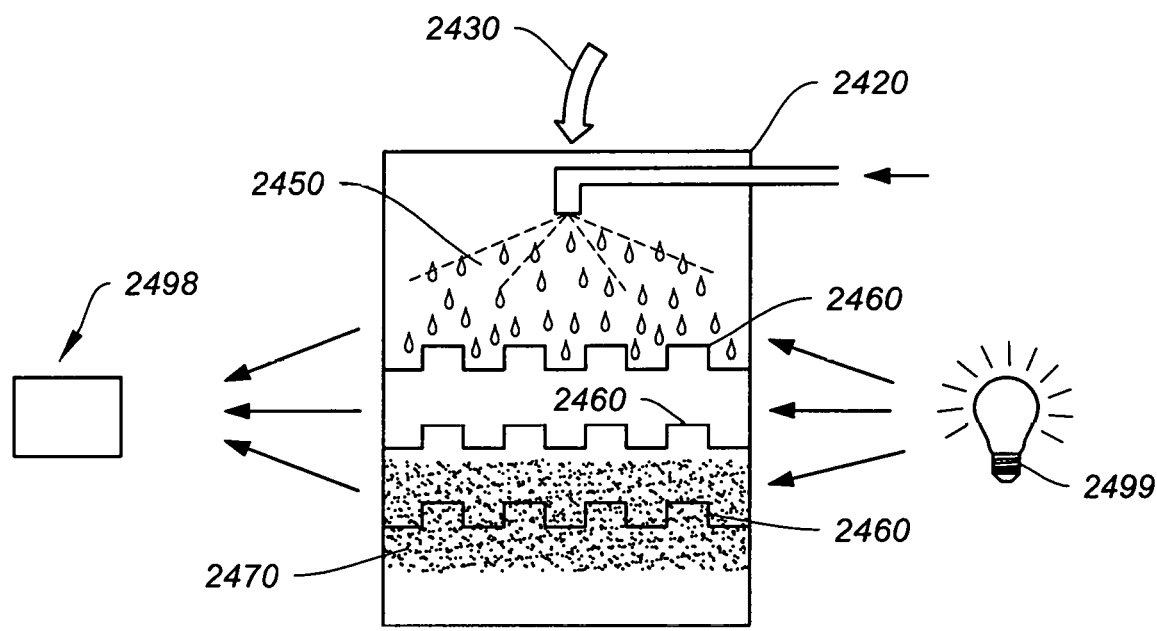
FIG. 24 illustrates how the photographs of FIGS. 22, 23 were taken.

FIG. 24 is a schematic representation showing how the photos in FIGS. 22 and 23 were taken. Screens 2460 were placed in transparent vessel 2420. Gas stream 2430 and solvent 2450 were introduced and "solvent pulsing" was induced. If a screen in the transparent vessel was free of solvent, light from bulb 2499 passed through easily. The photo taken by camera 2498 would show that segment as very bright.

Where a solvent pulse 2470 passes through the vessel, the pulse blocks the light and that section of the transparent vessel appears dark.

Videos taken with this set-up verified the formation of "solvent pulses" and the formation of "plug pulses" described above.

Figure 25:
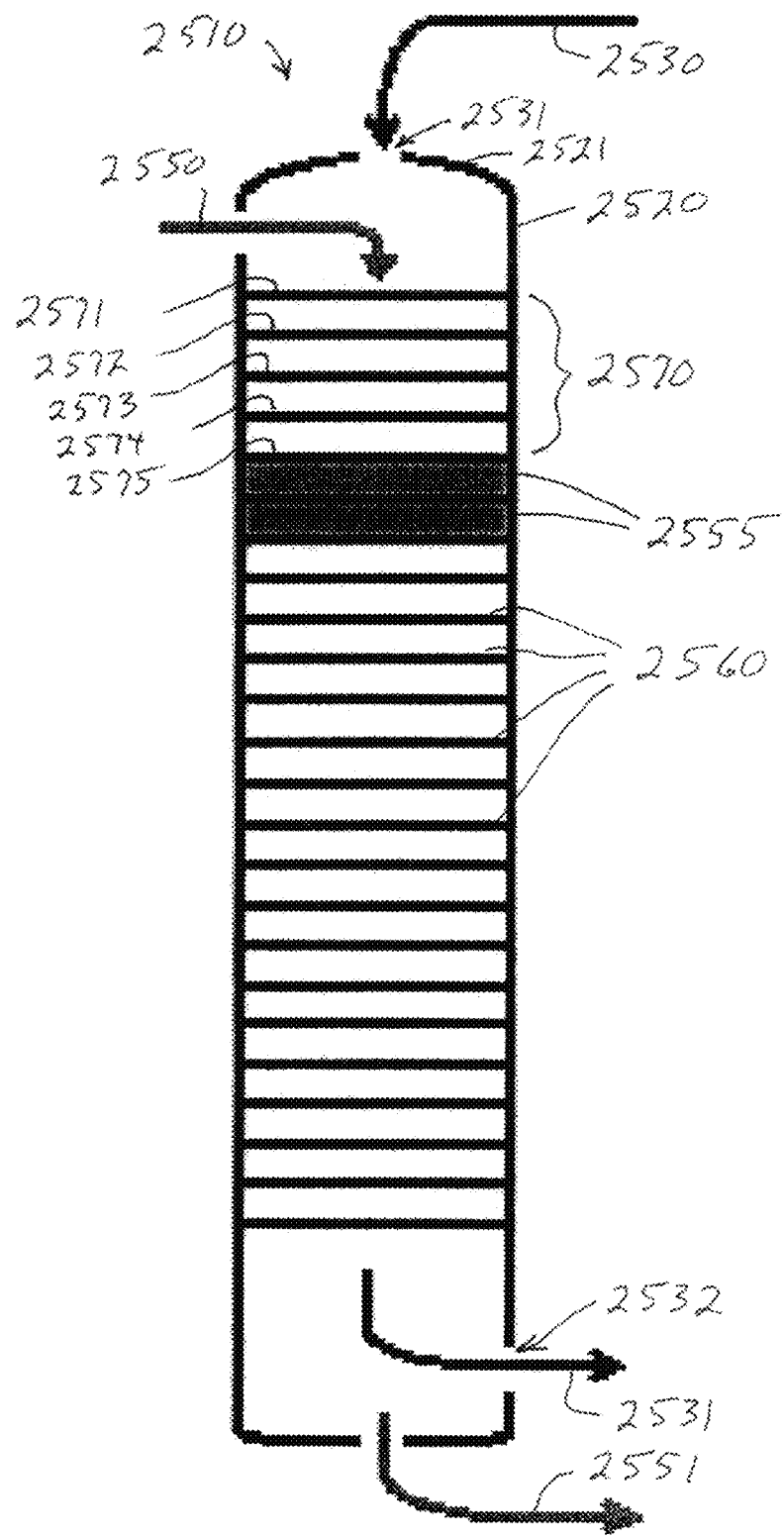
FIG. 25 is a schematic representation of the new induction array of screens near the top of a vertical reaction vessel.

FIG. 25 shows the most preferable embodiment of the invention. It is a schematic representation of absorber 2510 having a vertically extending, cylindrical reaction vessel 2520. Gas stream 2530 flows into upper inlet 2531, downwardly through vessel 2520 and is discharged through outlet 2532 as shown by arrow 2531. Liquid solvent 2550 is injected at the top of vessel 2520, flows downwardly and exits as shown by array 2551. A plurality of vertically spaced apart, shaped screens 2560, are carried inside reaction vessel 2520, each having substantially rectangular wave cross-sections. Each screen extends across the entire cross-section of reaction vessel 2520. Solvent 2550 is injected at the top of vessel 2520 by an injector not shown in FIG. 25 for clarity.

The novel, significant aspect of absorber 2510 is an induction array 2570 of preferably 5 screens 2571-2575 positioned near the top of reaction vessel 2520. Screens 2571-2575 are the same as the other screens 2560, but are positioned as described below. The purpose of the induction array 2570 is to achieve a solvent plug 2555 as near to the top 2521 of vessel 2520 as possible.

Figure 26:
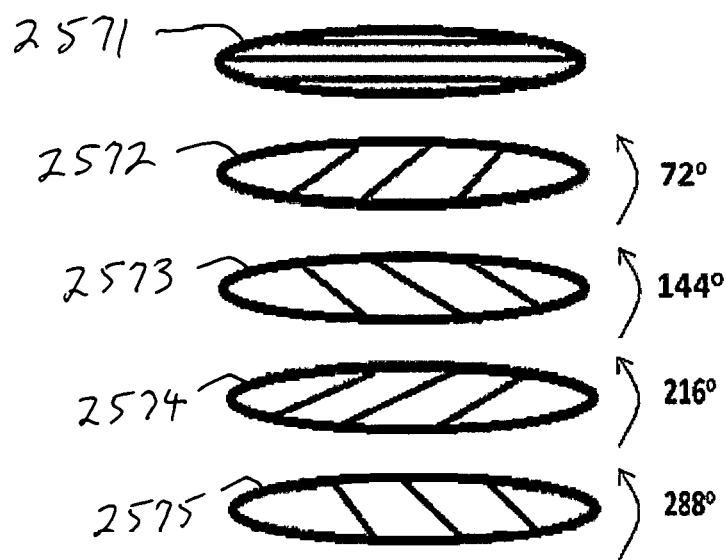
FIG. 26 is a schematic representation of how the screens of the induction array are rotated relative to each other.

FIG. 26 is a schematic of the array 2570, showing how each of the screens 2572-2575 below top screen 2571 is rotated about its central vertical axis in the same counter clockwise direction, looking downwardly relative to its upwardly adjacent screen by preferably 72 degrees. This degree of relative rotation of the screens induces a solvent plug 2555 of FIG. 25. The concept is to rotate each screen of the array an approximately equal amount, which tends to avoid localized clumping and which induces a uniform solvent plug 2555 adjacent to and below the lowermost screen 2575 of array 2570. The preferred number of screens in induction array 2570 is five screens, but we believe 3 to 8 screens could be utilized with less efficiency. In the general case of n screens, the rotation between adjacent screens is approximately 360/n degrees. By approximately, we mean plus or minus 10%.

As noted above, solvent plugs 2555 are continuously induced, and are rapidly cascaded downwardly through the plug propagating, shaped screens 2560 below induction array 2570. The cascading solvent plugs maximize the turbulence in the gas stream and other solvent plug pulses below the induction array 2570.

While solvent pulsing occurs above 0.5 meters per second of gas velocity we have found that the preferred velocity of gas stream 2530 is between 1.25 and 3.5 meters per second. We have also found that solvent plug pulsing at the greater velocities of 1.25 to 3.5 m/s achieves more than 25% more mass transfer than the same absorber in which gas velocity is less than 1.0 m/s. It is quite surprising that this increase in mass transfer occurs at relatively high gas stream velocities of 1.25 to 3.5 m/s due to the significantly reduced time of contact between solvent and gas stream.

Technical Description of Process

Gas/liquid absorption is a very common chemical process for using a liquid absorbent to remove a component from a gas stream or vice versa. Absorbers are used in natural gas processing, oil refining, chemical and petrochemical industries, pharmaceuticals, fertilizers, etc. Applications include;

Removal of contaminants such as $CO_2$, $H_2O$, or $H_2S$ from gas streams

Removal of contaminants from a liquid stream using gas as the absorbent

The absorbers shown and described herein can be used in all gas/liquid absorption applications.

Conventional absorbers use an absorbent solvent and packing to create surfaces through which mass transfer occurs. Liquid absorbent enters at the top of the absorber vessel and is distributed evenly across the full cross-sectional area of the packing using mechanical distributors. There are several types of packing, including random and structured. Random packing is made up from individual pressed metal, ceramic, or plastic shapes that are randomly dumped onto a support tray in the absorber creating a "packed bed". Structured packing is corrugated segments of metal or plastic formed into a structure with intricate surface area, located inside the absorber.

Alternatively, absorbers may use trays or plates which force contact between the target gas and solvent. A trayed absorber uses perforated plates, bubble caps or a valve tray to allow the gas to bubble up through the liquid absorbent to facilitate mass transfer. Mass transfer occurs as the absorbent liquid, draining downward from the top, contacts the target gas, flowing upward from below, as the gas bubbles through the perforations. A third type of absorber is a "spray tower" where the liquid absorbent is sprayed downward to create small droplets, thereby creating surfaces for mass transfer. The solvent droplets fall downward as the gas flows upward through the tower.

Large diameter absorbers (15 m) for gas/liquid absorption have difficulty maintaining an even and consistent gas and liquid flows over the cross-sectional area of the absorber. This results in channeling of the gas flowing upward through the liquid absorbent flowing downward, which in turn, leads to poor mass transfer.

In the present absorber, the gas passes down through the screens mixing with the liquid and in doing so forms an aqueous froth consisting of bubbles and droplets which create a very large surface area for mass transfer. But instead of leaving the bubbles and droplets intact in a confined space which would produce a relatively static, fixed surface area similar to prior art devices, the present invention continuously and violently ruptures or fragments and reforms the bubbles and droplets at a rapid rate. Some of the bubbles are caused to burst forming thousands of microscopic droplets from each bursting bubble whereby the active surface area of the liquid solvent is further increased. This high frequency and continuous regeneration of the surface of the liquid solvent is a significant aspect of the invention. An enormous reaction surface is created in a small volume. The reaction surface is continuously and violently ruptured and reformed to maximize the efficiency of the mass transfer.

The present absorber embodiment incorporates multiple gas absorber tubes in a modular design. The absorber tubes are optimized for consistent gas and liquid flow over the tube's cross-sectional area. The cross-sectional area of the absorber tubes can be cylindrical, square, rectangular, triangular or polyhedral. The exact shape is optimized for each application. The gas absorber tubes can be made out of metals, plastics, or ceramics to suit the process conditions. The individual gas absorber tubes are densely mounted onto, or through, horizontal bulkhead plates that divide the reaction chamber into vertical stages. A portion of the flow passes through each of the absorber tubes, maintaining consistent even flow over the cross-sectional area of the reaction chamber. This is just one feature of the design.

One application of the absorbers described herein is the removal of $CO_2$ from a gas stream. In this application it is anticipated that precipitating solvents will be more economical than non-precipitating solvents for large scale $CO_2$ capture, however in conventional packed-bed absorbers, the intricate structure and tortuous passageways through the random packing prevents the use of precipitating solvents.

In all embodiments, the liquid-to-gas contact surface area is increased via the creation of an aqueous froth which consists of droplets and bubbles instead of an intricate mechanical structure. The bubbles droplets, bursting bubbles, and micro-droplets provide high liquid-to-gas surface area between the solvent and target gas. Vortex tubes, detached eddies, and separated shear layers mix solvent with the target gas in the turbulent regime in-between the froth-generator plates. Micro-mixing of the droplet and bubble structures facilitates efficient absorption of the target gas.

When precipitating solvents are used, the absorbers of the invention operate without the precipitants blocking the absorber The specifically designed mechanical substrate (or screen) generates an aqueous froth with a large and intricate gas/liquid interfacial area. In conventional counter-current flow packed bed towers used for gas absorption, solvent drains down in a trickle mode over random or structured packing that forms the mechanical substrate while the gas flows upward from the bottom to the top of the tower. The limited gas/liquid interfacial area consists of the wetted packing and liquid filaments formed between individual elements or structure of the packing by the liquid solvent draining over the substrate.

The substrate of the present absorber consists of a plurality of corrugated screens that are separated by spacers. The screens are specifically designed to create an aqueous froth and optimize solvent pulsing. Bubbles are formed as the solvent and gas flow through the screen openings. The bubbles combine to form aqueous froth. The liquid/gas interfacial area formed by the wetted substrate or screen of the absorber is increased exponentially by the formation of the aqueous froth and micro-droplets produced by bursting bubbles and the gas flow shearing solvent droplets from the wires of the screens.

The substrate or screen is optimized to form solvent plug pulses of consolidated froth matrices over the cross-sectional area of the absorber chamber to prevent the gas flow from bypassing around the pulses. The corrugated screens form parallel ridges and valleys across the area of the screens. The volume of space inside the valleys is on the upstream side of the screens and the volume of space inside the ridges is on the downstream side of the screens. As gas pressure drops across the screen, the valleys on the upstream side of the screens have higher pressure than the ridges on the downstream side of the screens. The flow of gas and liquid is through the top of the ridges into the ridges and through the bottom of the valleys into the space in-between the screens, and through the walls of the ridges and valleys from the valleys into the ridges.

The substrate consists of an initial set of pulse generator or induction screens followed by a set of pulse propagation screens. The pulse generation screens are generally closer together and have smaller screen opening sizes than pulse propagation screens, but also have higher pressure drop across the screen. Pulse propagation screens have larger screen openings and may be spaced further apart than the pulse generator screens, depending on the reaction kinetics of the solvent. Pulse propagation screens are used to regenerate the reactant surfaces of the pulses and to reduce overall pressure drop across the column of screens in the reaction chamber. Once a plug pulse is formed in the pulse generator screens, momentum, energy from the gas flow, and the acceleration of gravity (in vertical columns) advance the pulse through the pulse propagation screens.

In the initial pulse generator screen, continuous streams of bubbles are generated as the gas and liquid flow through the screen openings in the top and side walls of the square wave tops and through the screen openings in the bottom of the square waves. The bubbles combine in the ridges and in-between the screens to form a continuous flow of aqueous froth to the second pulse generator screen. In the second pulse generator screen, a portion of the froth generated as the gas and liquid flow through the screen openings in the ridges are held up inside the ridges. As more froth is held up in the ridges across the area of the screen, the flow resistance through the screen increases until a portion of the froth being held up in the ridges is released or projected out of the ridges as a pulse of aqueous froth that is a portion of the area of the screen. As the hold-up and pulsing phenomena occurs in the next few downstream screens, the aqueous froth pulses consolidate to cover the entire cross-sectional area of the screens, forming a plug pulse as shown in FIG. 11D. The plug pulses advance through the downstream pulse propagation screens and prevent the gas flow from bypassing around the solvent pulses.

The liquid/gas interfacial area of the aqueous froth is regenerated at high frequency. Depending on the pulse velocity and the spacing between the screens, the interfacial area can be regenerated up to 100 times per second.

As the target gas is absorbed into the solvent, the concentration of the reactant species in the solvent is depleted at the interface thereby reducing the driving force of the reaction. The liquid phase resistance to mass transfer increases, reducing the driving force between the two phases, and decreases the reaction kinetics between the gas and liquid phases. As the pulses of solvent advance through the reaction chamber, the liquid/gas interfacial area of the pulses is regenerated each time the solvent pulse passes through a screen. Each time the liquid/gas interfacial area is regenerated the local reactant surfaces are replenished with the leanest solvent available at that stage of the absorber. Replenishing the local reactant surfaces with lean solvent increases the differential concentration between the gas phase and liquid phase, decreases the liquid phase mass transfer resistance, and maintains high reaction kinetics throughout the reaction chamber.

When lean solvent loads up with target gas molecules captured from the mixed gas flow, the reactant species is depleted forming rich solvent. Rich solvent is regenerated by boiling off the target gas molecules, and the lean solvent is recycled back into the absorber to capture more of the target gas. In some situations the reactant product formed by the chemical reaction can exceed the solubility limit and form a precipitant. A precipitating solvent can be used in some applications to significantly reduce the cost of solvent regeneration by reducing the amount of liquid that has to be boiled to release the captured target gas molecules from the rich solution.

Conventional counter-current flow packed bed towers clog up when operated with precipitating solvents. The present absorber can operate with precipitating solvents that would clog a conventional counter-current flow packed bed tower. In the present absorber, the solvent pulses that advance through the column of screens and are reformed at high frequency create a dynamic environment inside the reaction chamber that prevents precipitants from growing to a size large enough to clog the mechanical substrate, and the momentum of the pulses shear the precipitants off of the substrate.

In the present absorber the mechanical substrate or screens wetted by the solvent forms a small portion of the total liquid/gas interfacial area. The dynamic environment prevents precipitants from growing large enough to clog the screen openings. The momentum of the pulses transports the precipitants out of the reaction chamber. The least dynamic zones in the absorber are the spaces between the spacers along the wall of the reaction chamber. But even these spaces are filled and emptied at high frequency as the pulses advance through the absorber column, thereby preventing the buildup of precipitants in the spaces between the spacers along the walls of the reaction chamber. The momentum of the pulses shear the precipitants off of the substrate, flush the spaces between the spacers along the walls of the reaction chamber, and transport the precipitants out of the reaction chamber.

What is unique and novel about the present absorber is that plug pulses are generated with a minimum of substrate, initiated within a short linear distance at the top of the absorber column, and formed of aqueous froth at low liquid flow. The plug pulses consist of an aqueous froth matrix of contiguous small bubbles, micro-droplets, and fluid fragments. It is this froth matrix, rather than the metallic surface of the packing itself, that creates the interfacial surface area for mass transfer. A 'froth' is defined as a mass of small bubbles in liquid caused by an agitation, fermentation, etc.; foam.

Inconsistent bubble formation across the area of the first screen leads to anisotropic holdup of bubbles in the ridges of the second screen. Discontinuous flows of bubbles are projected across the space in between the screens and onto the second screen.

The bubbles are reformed as they flow into the ridges of the second screen through the tops of the ridges and through the walls between the ridges and valleys of the square shaped screen. Capillary forces between the bubbles and the walls of the ridges hold some of the bubbles in the ridges. It is this anisotropic holdup of bubbles in the ridges that is the beginning of the unstable flow that develops into the pulsing phenomena.

Anisotropic distribution of bubbles increases or decreases local frequency of bubble formation across the area of the second screen. Membranes formed in the screen openings of tops and walls of the ridges of the second screen form intermittent streams of bubbles inside the ridges. Local concentration variances of bubble formation cause anisotropic flows of bubbles along the linear distance of the ridge. As more solvent is held up in the ridges, more gas flow through the screen is blocked, increasing differential pressure across the screen. At a point of equilibrium between the capillary forces between the solvent and the wires of the screen and the inertial forces between the gas and liquid flows and the bubbles being held up in the ridges, a localized pulse of froth matrices separates from a portion of a ridge or group of ridges. The pulse is projected across localized sections of several ridges that are offset about 72 degrees of the next downstream screen.

When the localized pulse from several ridges impacts the ridges in the next downstream screen, froth and bubbles held up in the ridges of the downstream screen cascades from the affected ridges, adding to the growing pulse. As partial pulses cascade and grow through the first five screens, the collective rotation of the ridges reaches 360 degrees and the mass of the pulse increases enough to form a plug pulse of froth that covers the entire area of the screens. The plug pulse prevents gas channeling around the solvent over a wide range of gas and solvent flow rates.

This is the mechanism by which the present absorber is able to generate plug pulses of aqueous froth within the first three inches, and the first five screens, of the absorber column and is unique and novel from the pulse generation, initiation, and formation documented in the available literature.

An additional unique and novel feature of the present absorber is the continuously changing gas-liquid interface. In a trickle flow absorber, solvent flowing over a mechanical substrate produces a limited interfacial area with little mixing between phases and between the solute and solution. The gas-liquid interface of the present absorber is constantly changing. The pulsing flow regime continuously reforms the gas-liquid interface as the multiphase flow advances through the absorber column. The turbulent flow creates more interfacial area. Increases the rate of mass transfer per unit volume, continually disperses the solute throughout the solution, and minimizes liquid phase and gas phase mass transfer resistance. In an exothermic reaction, the intricate interfacial area and the continuous mixing of the bulk with the boundary layers of bubbles walls, droplets, and fluid fragments transfers heat rapidly from the reaction to the liquid and across the phase boundary. By continuously changing the gas-liquid interface the present absorber maintains a high mass transfer rate throughout the absorber column.

Another unique and novel feature of the WES absorber is that the distance between the pulse propagation screens can be adjusted to account for the mass transfer speed of the solvent being used in relation to pressure drop per length of absorber column.

The distance between the pulse propagation screens is determined by the mass transfer speed of the solvent. For a fast solvent like Monoethanolamine (MEA) the pulse propagation screens are the same distance apart as the pulse generation screens (About 0.25"). With the screens closer together, the gas-liquid interface is regenerated at higher frequency. When using a fast solvent, regenerating the interface at higher frequency prevents solvent loading at the interface from slowing down mass transfer. However, having the screens closer together increases pressure drop per length of absorber column.

For slower solvents like Potassium Hydroxide or Sodium Glycinate the pulse generation screens are further apart (0.375" to 1.0"). Slower solvents take more time to load up the surface layers of the solvent near the gas-liquid interface. Increasing the distance between the pulse propagation screens reduces the pressure drop per length of absorber column.

Another unique and novel feature of the WES absorber is that increasing the gas velocity increases mass transfer by more than 25%. The increase in mass transfer at higher gas flow rates is due to the increase in energy being transferred from the gas phase to the liquid phase. Higher gas flow rate increases pulse velocity and creates a more intricate gas-liquid interface with a higher interface renewal rate. Higher gas flow rate also increases turbulence, which increases the mixing of the solute into the solution and presents the leanest solvent available at that point in the absorber to the gas-liquid interface. These mechanisms maximize mass transfer throughout the absorber column.

Objects and Advantages

The liquid-to-gas surface area is increased using specifically shaped screens to shatter or rupture the solvent into a myriad of droplets which create a very large surface area for mass transfer which is made up of the solvent itself. But instead of leaving the small droplets intact in a confined space which would produce a relatively static, fixed surface area similar to prior art devices, the present invention continuously and violently ruptures and reforms the droplets at a rapid rate. Bubbles also form which in turn are caused to burst forming thousands of microscopic droplets from each bursting bubble, whereby the active surface area of the liquid solvent is further increased. This high frequency and continuous regeneration of the surface of the liquid solvent is a significant aspect of the invention. An enormous reaction surface is created in a small volume. The reaction surface is continuously and violently ruptured and reformed to maximize the efficiency of the mass transfer. The huge surface area provided by these droplets and bubbles for mass transfer, combined with its unstable nature means that droplets and bubbles are reformed before mass transfer equilibrium is reached.

In other words, concentration of the component absorbed into solvent is still low when the droplets are reformed. Thus the concentration gradient, i.e. the difference between the concentrations of the target component in the gas, compared to the solvent, is still high. The dynamic reaction surface area is then reformed with lean solvent (i.e. solvent with a lower concentration of the absorbed component), thereby creating a high concentration gradient between the target gas and the solvent. The high concentration gradient maximizes the driving force for mass transfer.

The reactant surfaces are reformed at frequent intervals. Rich solvent is replaced with leaner solvent flowing down the tube. The reactant surfaces are reformed and replaced each time a pulse passes through one of the screens.

The absorbers can be designed to operate within the parameters required for optimal gas absorption of a variety of commercial and generic, precipitating and non-precipitating absorbent solvents which have a range of viscosities, surface tensions, and specific gravities.

Individual gas absorber tubes are densely packed into each stage of the FTGA embodiment. The stages are flooded with solvent to a predetermined level above the multiple solvent injection ports in the gas absorber tubes or to the top of the tubes themselves such that solvent is introduced at a predetermined rate into the gas absorber tubes in each absorber stage.

Screens may be used in combination with solvent distribution plates. These plates serve to assist in redistributing the solvent and gas as they pass down the tubes.

The flow of mixed gases and solvent passes through screens, located at frequent intervals in each froth generator assembly, in order to reform the reactant surfaces of the droplets, bubbles, and micro-droplets. Rich solvent from the reactant surfaces is replaced with leaner solvent from fluid structures in the flow field. These droplets, bubbles and micro-droplets provide a high liquid-to-gas contact-area between the solvents and the target gas.

The liquid/gas separators remove a portion of the rich solvent from the flow. Lean solvent introduced in the next absorber stage replaces the portion of rich solvent removed by the liquid/gas separators.

In order to be able use a variety of commercial and generic solvents which all have a range of viscosities, surface tensions, and specific gravities, the absorber can be designed to operate within the parameters required for optimal gas absorption of specific solvents.

The size and number of the FTGA tubes, the mesh size of the screens and open-area ratio of the screens are selected in order to balance pressure drop with efficiency.

The distance between a screens and distributor plates is balanced with gas velocity and pressure drop to optimize system performance and removal of the target impurity from the gas stream.

Similarly distance between screens is also balanced with the rate-of-reaction to provide more or less time and distance for turbulent structures to form and reactant surfaces to absorb the target gas at high reaction rates.

It is believed that the following happens in the absorbers described above: In a packed bed, diffusive flow over random or structured packing consists of a boundary layer wetting surface of packing, an intermediate flow regime, and a free surface flow exposed to gas. As layers of fluid molecules flow over other layers of fluid molecules and turbulence occurs in flow between solid surfaces moderate mixing occurs between the surface layer and the intermediate layer, but little mixing occurs between the intermediate layer and the boundary layer. Molecular attraction of solid molecules is stronger than attraction of fluid molecules so boundary layer remains relatively static. As reactant in free surface layer is exposed to target gas, reaction rate is limited to regeneration of fresh reactant surfaces exposed by moderate mixing between intermediate layer and free surface layer that is driven by turbulence and diffusive flow dynamics.

In a spray tower, currents in the free surface of falling droplets caused by friction between the gas molecules and fluid molecules and, to a lesser extent, the Marangoni effect drive mixing between the free surface layer molecules that have reacted with the target gas and fresh reactant from inside the droplet.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments suited to the particular use contemplated.

We claim:

1. A method of absorbing a selected component from an incoming flowing gas stream, wherein said absorption occurs across the surface of an aqueous froth comprising a liquid solvent for said selected component, said froth being intermixed with numerous bubbles and micro-droplets formed from causing bubbles in said froth to burst, the method comprising the steps of:

flowing said gas stream downwardly into and through a reaction vessel;

providing a plurality of mesh assemblies in and across the entire cross-sectional area of said reaction vessel, said mesh assemblies comprising shaped screens having substantially rectangular wave cross-sections wherein said mesh assemblies are spaced apart vertically from one another in tiers along the height of said reaction vessel, introducing said liquid solvent into the upper end of said reaction vessel, forming said aqueous froth by passing said liquid solvent into and through said plurality of said mesh assemblies, causing said solvent froth and micro-droplets to flow co-currently with said incoming gas stream and to accumulate rapidly and periodically on first regions of said shaped screens, thereby limiting the flow of said gas stream through said first regions, and causing increased velocity of said gas stream through second regions of said shaped screens;

causing said rapid periodic accumulations of solvent froth and micro-droplets to periodically and abruptly separate in clumps from said first regions of said shaped screens to achieve solvent pulsing, and to cause said clumps to flow downstream from each tier of said plurality of shaped screens toward another tier of shaped screens wherein an array of n said shaped screens is position near the top of said reaction vessel and each of said n screens is rotated about its central vertical axis in the same direction relative to its upwardly adjacent shaped screen by an angle of approximately 360/n degrees, whereby as said solvent froth and gas stream passes downwardly through said array of n shaped screens, a periodic solvent plug is achieved uniformly across the entire cross section of said reaction vessel and is achieved near the top of said reaction vessel, maximizing the turbulence in the gas stream and said solvent plug pulses below said array of n shaped screens by rapidly cascading a series of said periodic solvent plugs downwardly through said shaped screens positioned below said array of n shaped screens, minimizing the size of said solvent bubbles and the size of micro-droplets as said gas stream moves through each of said plurality of spaced apart tiers of screens by causing each tier of screens to burst any of said solvent bubbles of a given size in order to reform said solvent froth at each tier of screens to maximize the total surface area of said solvent froth, thereby maximizing the mass transfer between the incoming gas stream and said solvent froth and micro-droplets by the use of solvent plug pulsing;

whereby the mass transfer achieved by the use of solvent pulsing is more than 25% greater than the mass transfer achieved without solvent pulsing.

2. The method of claim 1 wherein the preferred range of solvent plug pulsing frequency is between 1 and 20 pulses per second.

3. The method of claim 1 wherein the most preferred range of solvent plug pulsing frequency is between 2 and 10 pulses per second.

4. The method of claim 1 wherein said tiers of screens are preferably sized and spaced to cause reformation of said solvent froth between 20 and 100 times per second.

5. The method of claim 1 wherein said tiers of screens are most preferably sized and spaced to cause reformation of said solvent froth between 40 and 80 times per second.

6. The method of claim 1 wherein said shaped screens have substantially square-wave cross sections.

7. The method of claim 1 wherein n=5.

8. The method of claim 1 wherein the velocity of said gas stream is between 1.25 and 3.5 meters per second, and wherein the mass transfer achieved is more than 25% greater than the mass transfer achieved at gas stream velocities less than 1.0 per second.

9. The method of claim 1 wherein said gas stream flow rate is greater than 0.5 meters/second, the screen opening size is between 0.040 inch and 0.150 inch, the screen wire diameter is between 0.020 inch and 0.050 inch, the spacing between screens is 0.25 inch to 0.75 inch and the height of each of said substantially square waves of said screens is between 0.25 inch and 0.75 inch.

\* \* \* \* \*